(12) United States Patent
Togasaki

(10) Patent No.: US 12,464,266 B2
(45) Date of Patent: Nov. 4, 2025

(54) IMAGING DEVICE AND ANALOG-TO-DIGITAL CONVERSION CIRCUIT

(71) Applicant: Sony Semiconductor Solutions Corporation, Kanagawa (JP)

(72) Inventor: Yusuke Togasaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 129 days.

(21) Appl. No.: 18/548,278

(22) PCT Filed: Feb. 1, 2022

(86) PCT No.: PCT/JP2022/003860
§ 371 (c)(1),
(2) Date: Aug. 29, 2023

(87) PCT Pub. No.: WO2022/215334
PCT Pub. Date: Oct. 13, 2022

(65) Prior Publication Data
US 2024/0137670 A1 Apr. 25, 2024
US 2024/0236526 A9 Jul. 11, 2024

(30) Foreign Application Priority Data

Apr. 8, 2021 (JP) ................. 2021-066051

(51) Int. Cl.
*H04N 25/772* (2023.01)
*H03M 1/56* (2006.01)
*H04N 25/76* (2023.01)

(52) U.S. Cl.
CPC ............ *H04N 25/772* (2023.01); *H03M 1/56* (2013.01); *H04N 25/7795* (2023.01)

(58) Field of Classification Search
CPC ............ H04N 25/772; H04N 25/7795; H03M 1/56; H03M 1/123
See application file for complete search history.

(56) References Cited

U.S. PATENT DOCUMENTS

2017/0347050 A1* 11/2017 Sakakibara .......... H04N 25/772
2019/0364235 A1* 11/2019 Honda ................. H04N 25/767
(Continued)

FOREIGN PATENT DOCUMENTS

JP     2008271278 A    11/2008
JP     2008283556 A    11/2008
(Continued)

OTHER PUBLICATIONS

International Search Report (PCT/ISA/210), International Application No. PCT/JP2022/003860, dated Apr. 19, 2022.

*Primary Examiner* — Nhan T Tran
(74) *Attorney, Agent, or Firm* — Michael Best & Friedrich LLP

(57) ABSTRACT

An imaging device of the present disclosure includes a first pixel circuit and a generation circuit. The first pixel circuit includes a first light-receiving circuit, a first comparator, a first control circuit, and a first latch circuit. The first light-receiving circuit is configured to generate a first pixel signal corresponding to the amount of received light. The first comparator is configured to generate a first comparison signal by comparing the first pixel signal with a first reference signal having a ramp waveform. The first control circuit is configured to generate a first comparison output signal by turning on and off an output of the first comparison signal on the basis of a first control signal. The first latch circuit is configured to latch a time code on the basis of transition of the first comparison output signal. The generation circuit is configured to generate the first control signal.

13 Claims, 17 Drawing Sheets

(56) References Cited

U.S. PATENT DOCUMENTS

| | | | |
|---|---|---|---|
| 2020/0228738 A1* | 7/2020 | Ogawa | H04N 25/772 |
| 2023/0300497 A1* | 9/2023 | Uno | H10F 39/8037 |
| | | | 348/308 |

FOREIGN PATENT DOCUMENTS

| | | | | |
|---|---|---|---|---|
| JP | 2018148528 A | | 9/2018 | |
| JP | 2019047383 A | * | 3/2019 | H04N 5/3745 |

* cited by examiner

[ FIG. 5 ]
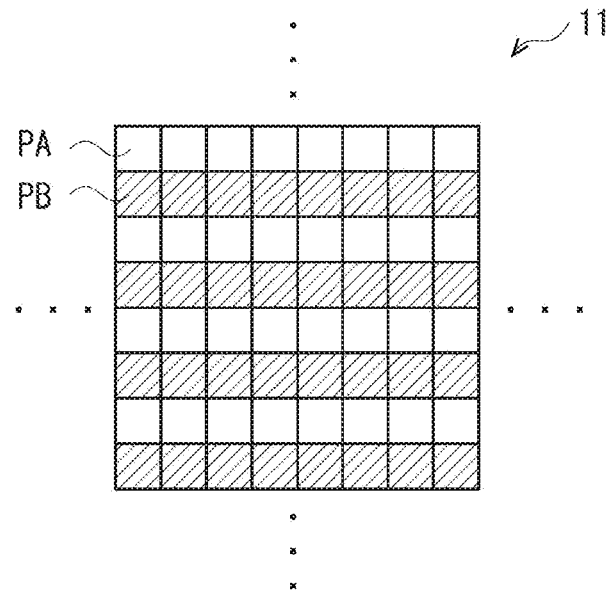
[ FIG. 6 ]
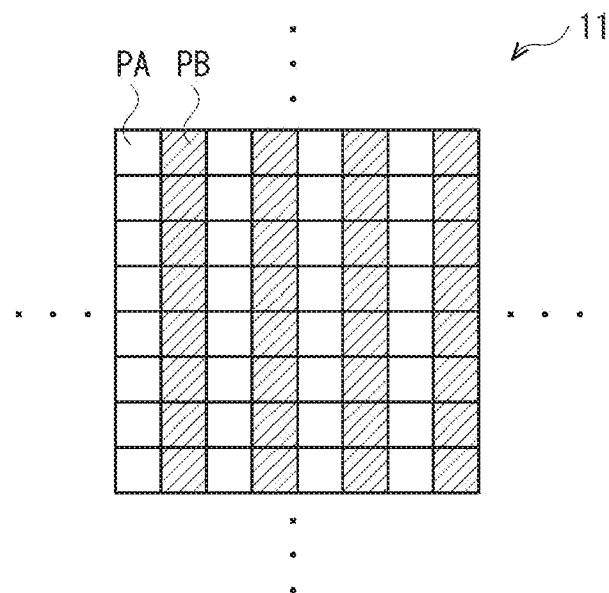

[FIG. 7]
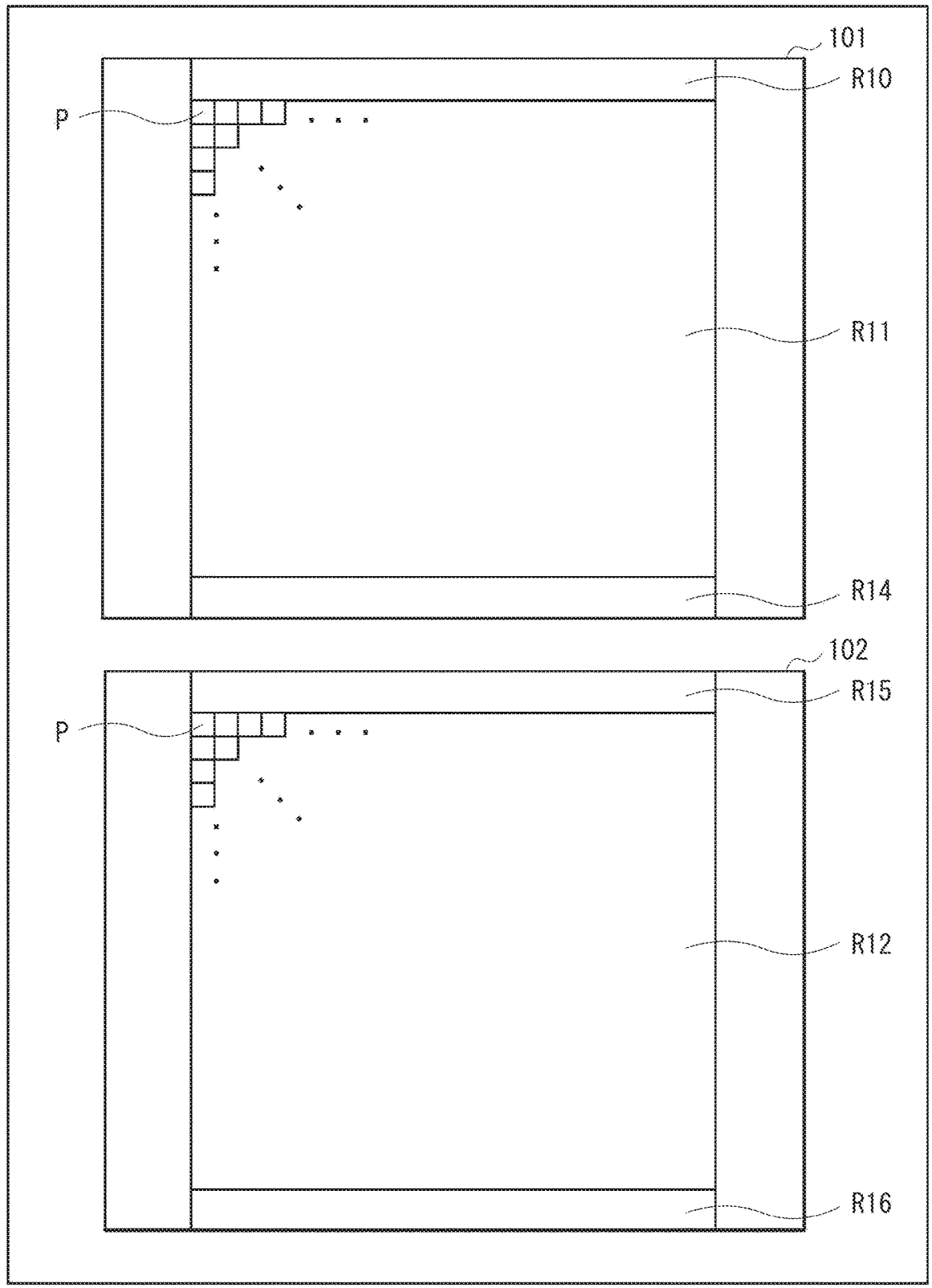

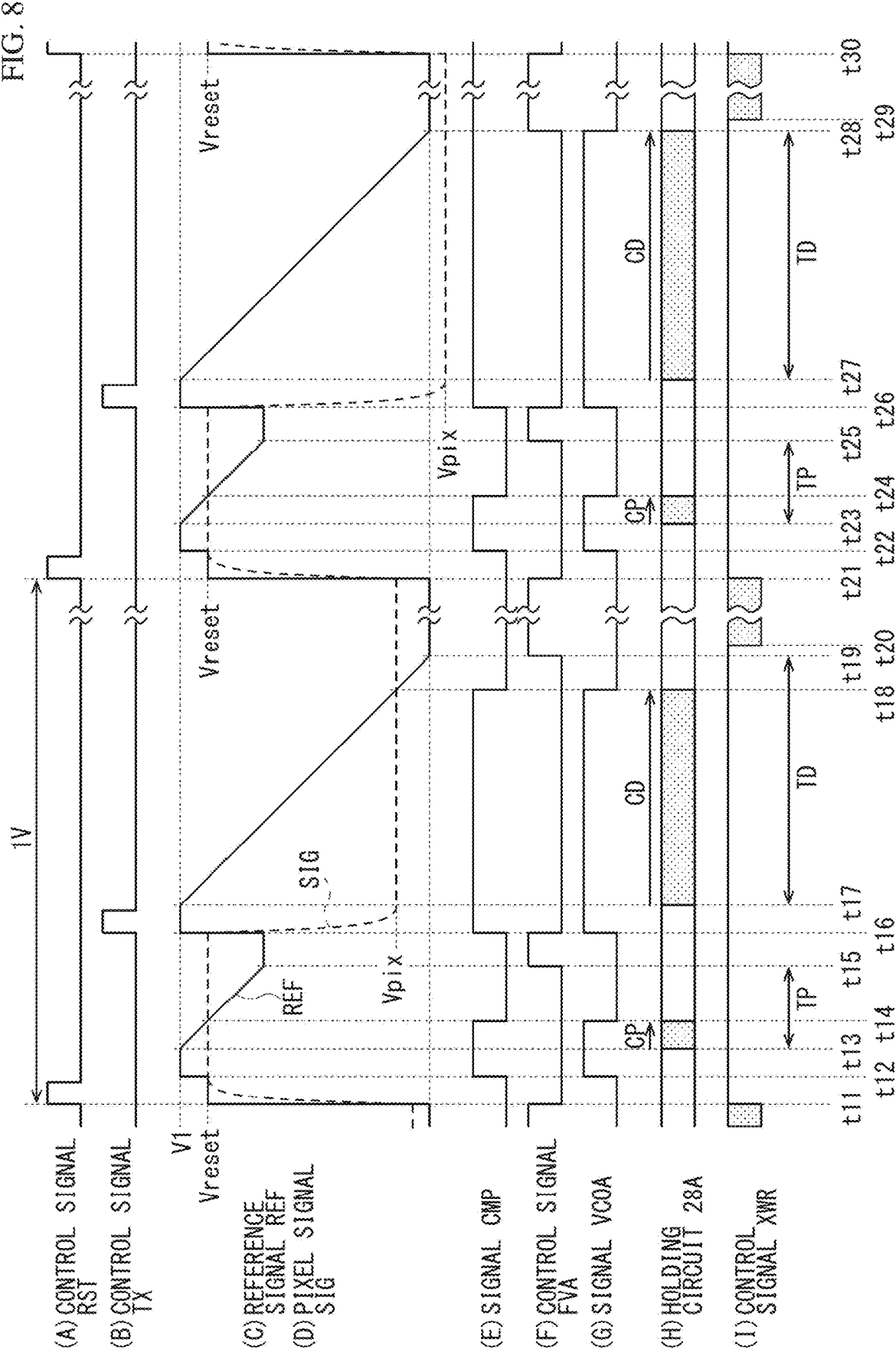

[ FIG. 18 ]
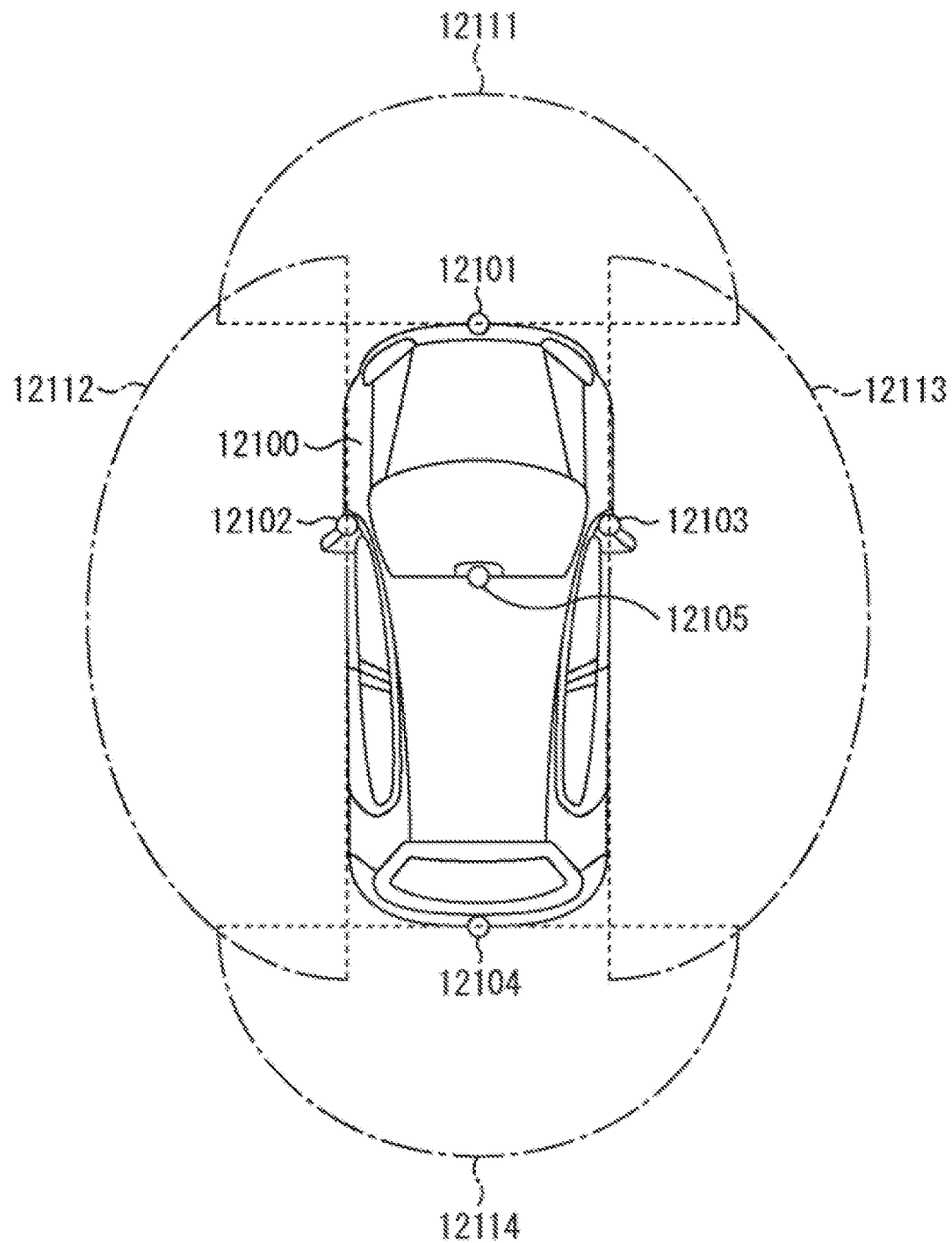

IMAGING DEVICE AND ANALOG-TO-DIGITAL CONVERSION CIRCUIT

TECHNICAL FIELD

The present disclosure relates to an imaging device that captures an image of a subject, and to an analog-to-digital conversion circuit for use in such an imaging device.

BACKGROUND ART

Typically, in an imaging device, pixels each including a photodiode are arranged in a matrix form, and each of the pixels generates a pixel voltage corresponding to an amount of received light. In addition, for example, an analog-to-digital conversion circuit (Analog to Digital Converter) converts the pixel voltage (analog signal) into a digital signal. For example, Patent Literature 1 discloses an AD conversion circuit provided for each pixel column and operating to cause no through-current to flow during an AD conversion period.

CITATION LIST

Patent Literature

Patent Literature 1: Japanese Unexamined Patent Application Publication No. 2018-148528

SUMMARY OF THE INVENTION

Incidentally, it is desired that an imaging device be reduced in power consumption, and expectations are placed on a further reduction in power consumption.

It is desirable to provide an imaging device and an analog-to-digital conversion circuit that each make it possible to reduce power consumption.

An imaging device according to an embodiment of the present disclosure includes a first pixel circuit and a generation circuit. The first pixel circuit includes a first light-receiving circuit, a first comparator, a first control circuit, and a first latch circuit. The first light-receiving circuit is configured to generate a first pixel signal corresponding to an amount of received light. The first comparator is configured to generate a first comparison signal by comparing the first pixel signal with a first reference signal having a ramp waveform. The first control circuit is configured to generate a first comparison output signal by turning on and off an output of the first comparison signal on the basis of a first control signal. The first latch circuit is configured to latch a time code on the basis of transition of the first comparison output signal. The generation circuit is configured to generate the first control signal.

An analog-to-digital conversion circuit according to an embodiment of the present disclosure includes a conversion circuit and a generation circuit. The conversion circuit includes a comparator, a control circuit, and a latch circuit. The comparator is configured to generate a comparison signal by comparing an analog signal with a reference signal having a ramp waveform. The control circuit is configured to generate a comparison output signal by turning on and off an output of the comparison signal on the basis of a control signal. The latch circuit is configured to latch a time code on the basis of transition of the comparison output signal. The generation circuit is configured to generate the control signal.

In the imaging device according to an embodiment of the present disclosure, the first pixel signal corresponding to the amount of received light is generated, and the first pixel signal is compared with the first reference signal having the ramp waveform to thereby generate the first comparison signal. The output of the first generation signal is turned on and off on the basis of the first control signal to thereby generate the first comparison output signal. The time code is then latched on the basis of the transition of the first comparison output signal.

In the analog-to-digital conversion circuit according to an embodiment of the present disclosure, the comparison signal is generated by comparing the analog signal with the reference signal having the ramp waveform. The output of the comparison signal is turned on and off on the basis of the control signal to thereby generate the comparison output signal. The time code is then latched on the basis of the transition of the comparison output signal.

BRIEF DESCRIPTION OF DRAWINGS

FIG. 5 is a circuit diagram illustrating an example of supply of control signals to pixel circuits illustrated in FIG. 3.

FIG. 6 is a circuit diagram illustrating another example of supply of the control signals to the pixel circuits illustrated in FIG. 3.

FIG. 7 is an explanatory diagram illustrating an example of a floor plan of the imaging device illustrated in FIG. 1.

FIG. 8 is a timing waveform diagram illustrating an operation example of the pixel circuit illustrated in FIG. 4.

FIG. 18 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Usage Example of Imaging Device
4. Example of Application to Mobile Body

1. First Embodiment

[Configuration Example]

Figure 1:
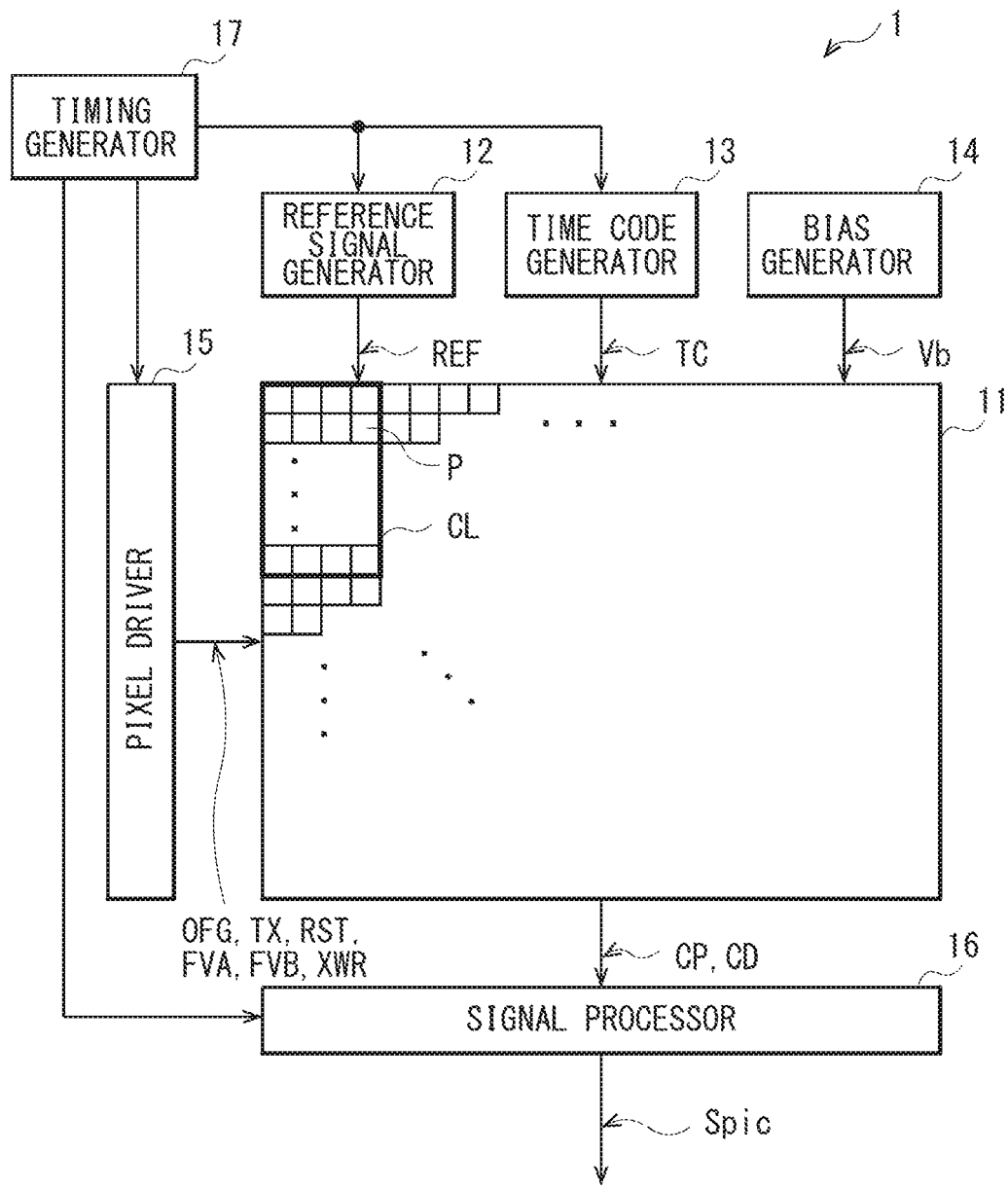
FIG. 1 is a block diagram illustrating a configuration example of an imaging device according to a first embodiment of the present disclosure.

FIG. 1 illustrates a configuration example of an imaging device (imaging device 1) according to an embodiment. The imaging device 1 includes a pixel array 11, a reference signal generator 12, a time code generator 13, a bias generator 14, a pixel driver 15, a signal processor 16, and a timing generator 17. In this example, the imaging device 1 is formed on two semiconductor substrates.

Figure 2:
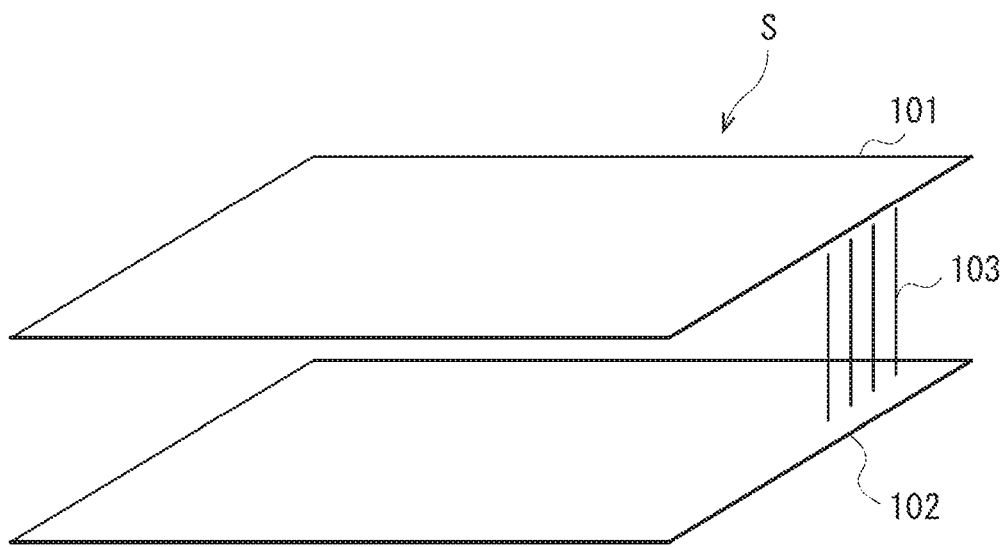
FIG. 2 is a schematic diagram illustrating an implementation example of the imaging device illustrated in FIG. 1.

FIG. 2 illustrates an implementation example of the imaging device 1. In this example, the imaging device 1 is formed on two semiconductor substrates 101 and 102. The semiconductor substrate 101 is disposed adjacent to an imaging surface S of the imaging device 1, and the semiconductor substrate 102 is disposed opposite to the imaging surface S of the imaging device 1. The semiconductor substrates 101 and 102 are laid over each other. Wiring lines of the semiconductor substrate 101 and wiring lines of the semiconductor substrate 102 are coupled to each other by wiring lines 103. The wiring lines 103 may be metallic bond, such as Cu—Cu bond.

The pixel array 11 (FIG. 1) includes a plurality of pixels P arranged in a matrix form. Each of the pixels P includes a photodiode PD, and is configured to generate a pixel signal SIG including a pixel voltage Vpix corresponding to an amount of received light and to perform AD conversion on the basis of the pixel signal SIG. In the pixel array 11, a predetermined number of pixels P constitute one cluster CL. In this example, the cluster CL includes four pixels P arranged side by side in a horizontal direction, and several tens of pixels P arranged side by side in a vertical direction. In the pixel array 11, such clusters CL are arranged side by side in the vertical direction and the horizontal direction.

Figure 3:
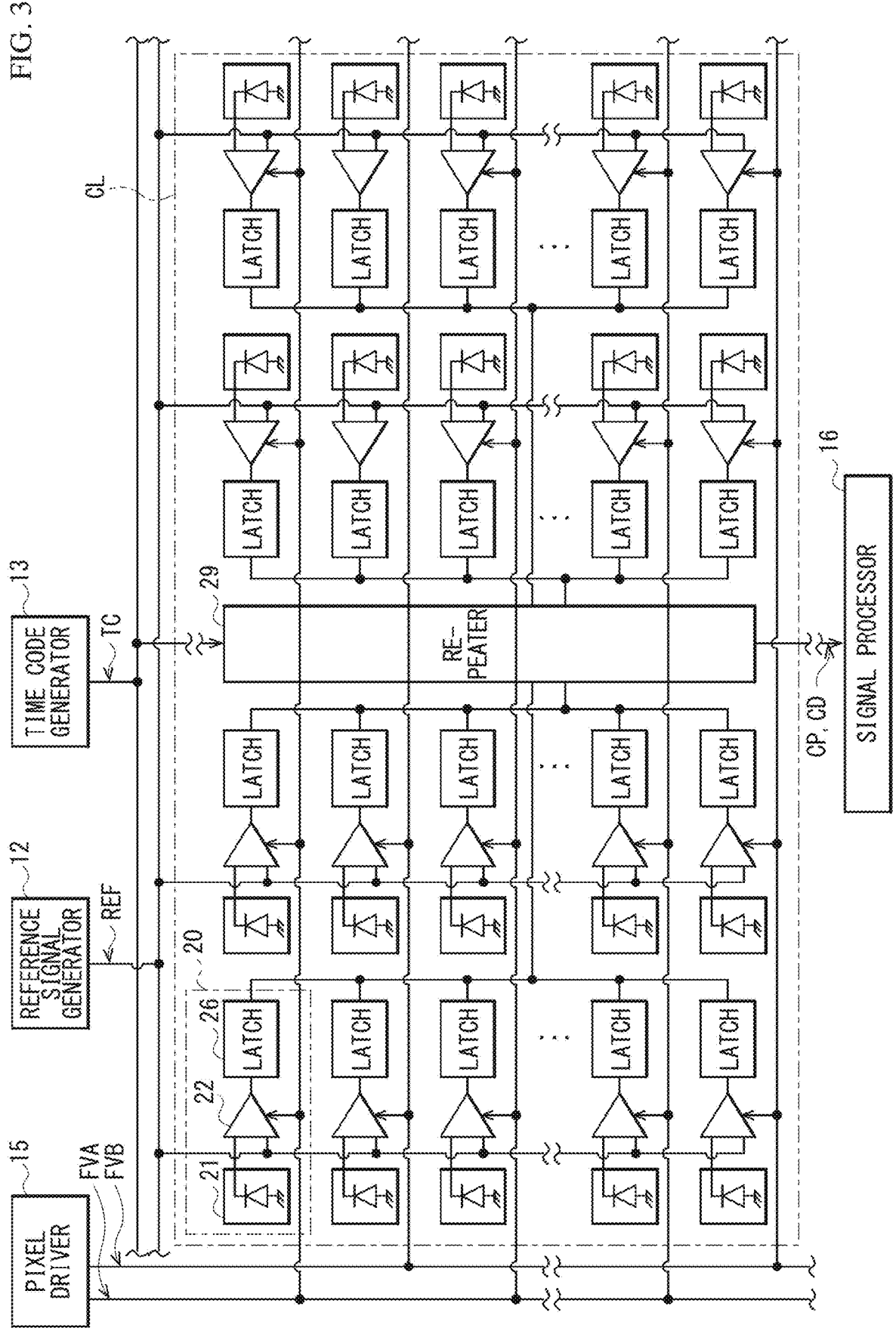
FIG. 3 is an explanatory diagram illustrating a configuration example of a cluster illustrated in FIG. 1.
Figure 4:
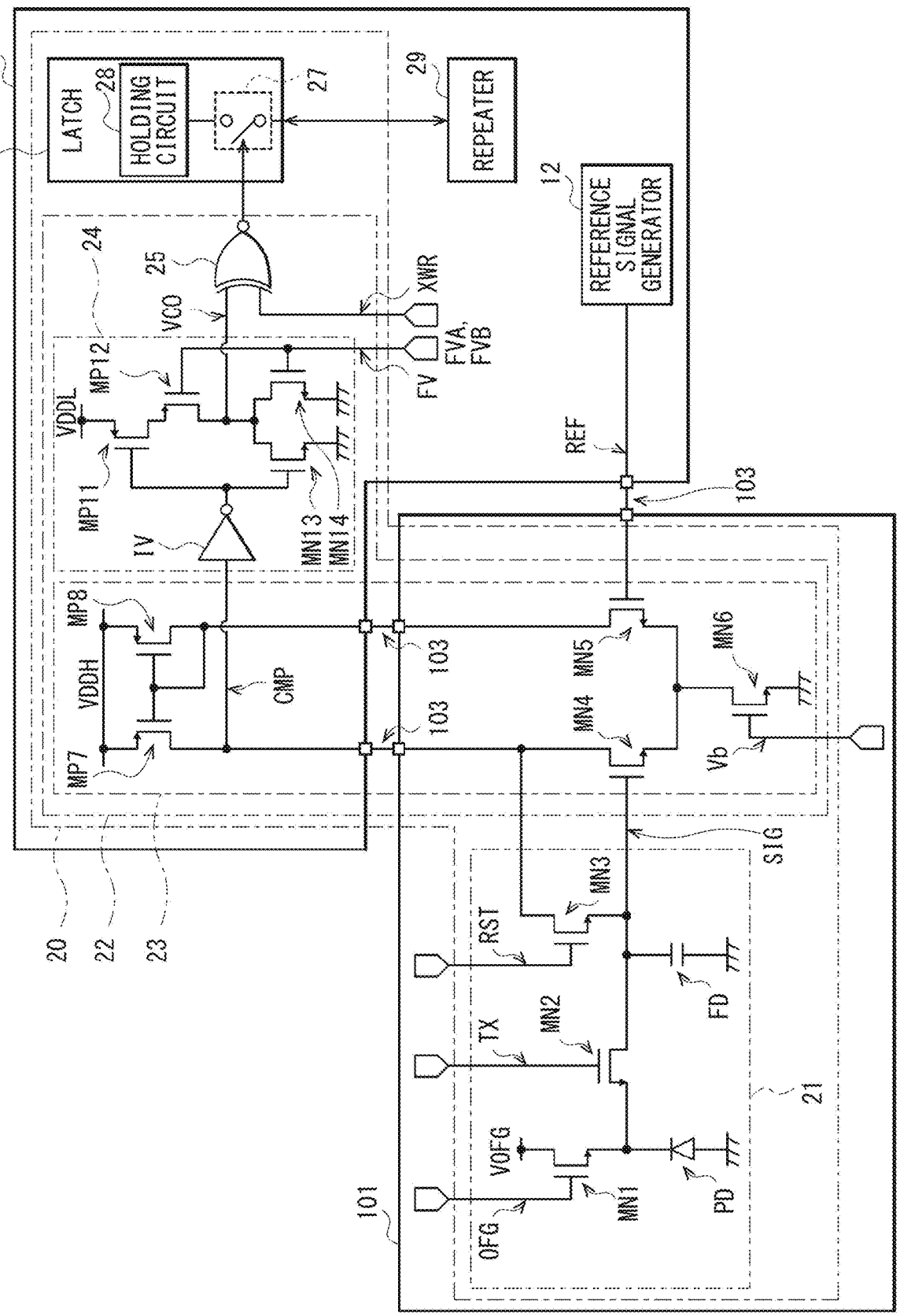
FIG. 4 is a circuit diagram illustrating a configuration example of a pixel circuit corresponding to a pixel illustrated in FIG. 1.

FIG. 3 illustrates a configuration example of the cluster CL. The cluster CL includes a plurality of pixel circuits 20 corresponding to the respective pixels P, and a repeater 29. FIG. 4 illustrates a configuration example of the pixel circuit 20. The pixel circuit 20 includes a light-receiving circuit 21, a comparator circuit 22, and a latch 26.

The light-receiving circuit 21 is configured to generate the pixel voltage Vpix corresponding to the amount of received light. The light-receiving circuit 21 includes the photodiode PD, transistors MN1 to MN3, and a floating diffusion FD. The transistors MN1 to MN3 are N-type MOS (Metal Oxide Semiconductor) transistors. As illustrated in FIG. 4, the light-receiving circuit 21 is disposed on the semiconductor substrate 101.

The photodiode PD is a photoelectric conversion element that generates electric charge in an amount corresponding to the amount of received light and accumulates the electric charge therein. The photodiode PD has an anode grounded, and a cathode coupled to the transistors MN1 and MN2.

The transistor MN1 has a gate to be supplied with a control signal OFG from the pixel driver 15 (FIG. 1), a drain to be supplied with a voltage VOFG, and a source coupled to the cathode of the photodiode PD and a source of the transistor MN2.

The transistor MN2 has a gate to be supplied with a control signal TX from the pixel driver 15 (FIG. 1), the source coupled to the cathode of the photodiode PD and the source of the transistor MN1, and a drain coupled to the floating diffusion FD, a source of the transistor MN3, and a gate of a transistor MN4 (described later) in the comparator circuit 22.

The floating diffusion FD is configured to accumulate electric charge transferred from the photodiode PD. The floating diffusion FD includes, for example, a diffusion layer formed on a surface of the semiconductor substrate 101. FIG. 4 illustrates the floating diffusion FD by using a symbol of a capacitor.

The transistor MN3 has a gate to be supplied with a control signal RST from the pixel driver 15 (FIG. 1), a drain coupled to a drain of the transistor MN4 (described later) of the comparator circuit 22, and the source coupled to the floating diffusion FD, the drain of the transistor MN2, and the gate of the transistor MN4 (described later) of the comparator circuit 22.

With this configuration, in the light-receiving circuit 21, the electric charge accumulated in the photodiode PD is discharged by turning-on of the transistor M-NI based on the control signal OFG. An exposure period is then started by turning-off of the transistor MN1, and electric charge in the amount corresponding to the amount of received light is accumulated in the photodiode PD. Then, after the exposure period ends, the light-receiving circuit 21 supplies the pixel signal SIG including a reset voltage Vreset and the pixel voltage Vpix to the comparator circuit 22. Specifically, as described below, during a P-phase (Pre-charge phase) period TP after the voltage of the floating diffusion FD is reset, the light-receiving circuit 21 supplies the voltage of the floating diffusion FD at that time as the reset voltage Vreset to the comparator circuit 22. In addition, during a D-phase (Data phase) period TD after electric charge is transferred from the photodiode PD to the floating diffusion FD, the light-receiving circuit 21 supplies the voltage of the floating diffusion FD at that time as the pixel voltage Vpix to the comparator circuit 22.

The comparator circuit 22 (FIGS. 3 and 4) is configured to compare the pixel signal SIG (the pixel voltage Vpix and the reset voltage Vreset) with a reference signal REF. As illustrated in FIG. 3, one of control signals FVA and FVB is supplied to the comparator circuit 22. In this example, the control signal FVA is supplied to the comparator circuit 22 belonging to a first row from the top of the cluster CL, the control signal FVB is supplied to the comparator circuit 22 belonging to a second row, the control signal FVA is supplied to the comparator circuit 22 belonging to a third row, and the control signal FVB is supplied to the comparator circuit 22 belonging to a fourth row. As illustrated in FIG. 5, the pixel P (pixel PA) to be supplied with the control signal FVA and the pixel P (pixel PB) to be supplied with the control signal FVB are arranged alternately in the vertical direction in the pixel array 11. It is to be noted that this is not limitative, and as illustrated in FIG. 6, the pixel PA and the pixel PB may thus be arranged alternately in the horizontal direction in the pixel array 11.

As illustrated in FIG. 4, the comparator circuit 22 includes a comparator 23, a control circuit 24, and an exclusive NOR circuit (FXNOR) 25.

The comparator 23 is configured to generate a signal CMP by comparing the pixel signal SIG with the reference signal REF. The comparator 23 sets the signal CMP to a high level in a case where a voltage of the reference signal REF is higher than the voltage of the pixel signal SIG, and sets the signal CMP to a low level in a case where the voltage of the reference signal REF is lower than the voltage of the pixel signal SIG. The comparator 23 includes transistors MN4 to MN6 and transistors MP7 and MP8. The transistors MN4 to MN6 are N-type MOS transistors, and the transistors MP7 and MP8 are P-type MOS transistors. As illustrated in FIG. 4, the comparator 23 is disposed over the two semiconductor substrates 101 and 102. Specifically, the transistors MN4 to MN6 are disposed on the semiconductor substrate 101, and the transistors MP7 and MP8 are disposed on the semiconductor substrate 102.

The transistor MN4 has the gate to be supplied with the pixel signal SIG, the drain coupled to the drain of the transistor MN3 of the light-receiving circuit 21 and coupled to a drain of the transistor MP7 and an input terminal of an inverter IV (described later) of the control circuit 24, and a source coupled to a source of the transistor MN5 and a drain of the transistor MN6. The transistor MN5 has a gate to be supplied with the reference signal REF from the reference signal generator 12 via the wiring line 103 between the semiconductor substrates 101 and 102, a drain coupled to a drain of the transistor MP8 and gates of the transistors MP7 and MP8 via the wiring line 103 between the semiconductor substrates 101 and 102, and the source coupled to the source of the transistor MN4 and the drain of the transistor MN6. As will be described in detail later, the reference signal REF is a signal having what is called a ramp waveform in which a voltage level gradually changes with a lapse of time during the P-phase period TP and the D-phase period TD. The transistor MN6 has a gate to be supplied with a bias voltage Vb from the bias generator 14 (FIG. 1), the drain coupled to the sources of the transistors MN4 and MN5, and a source grounded. The transistors MN4 and MN5 configure a differential pair, and the transistor MN6 configures a constant current source.

The transistor MP7 has the gate coupled to the gate and the drain of the transistor MP8 and coupled to the drain of the transistor MN5 via the wiring line 103 between the semiconductor substrates 101 and 102, a source to be supplied with a power supply voltage VDDH, and the drain coupled to the input terminal of the inverter IV (described later) of the control circuit 24 and coupled to the drain of the transistor MN4 and the drain of the transistor MN3 of the light-receiving circuit 21 via the wiring line 103 between the semiconductor substrates 101 and 102. The transistor MP8 has the gate coupled to the gate of the transistor MP7 and the drain of the transistor MP8 and coupled to the drain of the transistor MN5 via the wiring line 103 between the semiconductor substrates 101 and 102, a source to be supplied with the power supply voltage VDDH, and the drain coupled to the gates of the transistors MP7 and MP8 and coupled to the drain of the transistor MN5 via the wiring line 103 between the semiconductor substrates 101 and 102. The transistors MP7 and MP8 configure active loads of the transistors MN4 and MN5.

With this configuration, the comparator 23 compares the pixel signal SIG with the reference signal REF. The comparator 23 then outputs a voltage at the drain of the transistor MP7 as the signal CMP.

The control circuit 24 includes the inverter IV and transistors MP11, MP12, MN13, and MN14. The transistors MP11 and MP12 are P-type MOS transistors. The transistors MN13 and MN14 are N-type MOS transistors. As illustrated in FIG. 4, the control circuit 24 is disposed on the semiconductor substrate 102.

The inverter IV has the input terminal to be supplied with the signal CMP, and an output terminal coupled to gates of the transistors MP11 and MN13.

The transistor MP11 has the gate coupled to the gate of the transistor MN13 and the output terminal of the inverter IV, a source to be supplied with a power supply voltage VDDL, and a drain coupled to a source of the transistor MP12. The power supply voltage VDDL is lower than the power supply voltage VDDH. The transistor MP12 has a gate to be supplied with a control signal FV (the control signal FVA or FVB) from the pixel driver 15 (FIG. 1), the source coupled to the drain of the transistor MP11, and a drain coupled to drains of the transistors MN13 and MN14 and the exclusive NOR circuit 25. Specifically, in the pixel circuit 20 corresponding to the pixel PA, the control signal FVA is supplied to the gate of the transistor MP12, and in the pixel circuit 20 corresponding to the pixel PB, the control signal FVB is supplied to the gate of the transistor MP12. The transistor MN13 has the gate coupled to the gate of the transistor MP11 and the output terminal of the inverter IV, the drain coupled to the drains of the transistors MP12 and MN14 and the exclusive NOR circuit 25, and a source grounded. The transistor MN14 has a gate to be supplied with the control signal FV (control signal FVA or FVB) from the pixel driver 15 (FIG. 1), the drain coupled to the drains of the transistors MP12 and MN13 and the exclusive NOR circuit 25, and a source grounded. Specifically, in the pixel circuit 20 corresponding to the pixel PA, the control signal FVA is supplied to the gate of the transistor MN14, and in the pixel circuit 20 corresponding to the pixel PB, the control signal FVB is supplied to the gate of the transistor MN14. The control circuit 24 then outputs a voltage of each of the transistors MP12, MN13, and MN14 as a signal VCO.

With this configuration, in a case where the control signal FV is at a low level, the control circuit 24 outputs the signal VCO corresponding to the signal CMP supplied from the comparator 23. Specifically, in a case where the signal CMP is at the high level, the control circuit 24 sets the signal VCO to a high level, and in a case where the signal CMP is at the low level, the control circuit 24 sets the signal VCO to a low level. In addition, in a case where the control signal FV is at a high level, the control circuit 24 outputs the signal VCO that is at the low level.

The exclusive NOR circuit 25 has a first input terminal to be supplied with the signal VCO, a second input terminal to be supplied with a control signal XWR from the pixel driver 15 (FIG. 1), and an output terminal coupled to the latch 26.

The latch 26 (FIGS. 3 and 4) is configured to latch a time code TC supplied from the repeater 29 on the basis of an output signal of the exclusive NOR circuit 25. The time code TC changes with a lapse of time. The time code TC is a code of a plurality of bits and may be, for example, a gray code. The latch 26 is coupled to the repeater 29 via a bus wiring line having a bit width of a plurality of bits. As will be described later, the latch 26 latches the time code TC at a transition timing of the output signal of the exclusive NOR circuit 25 in the P-phase period TP to thereby acquire time (a code value CP) from a start of the P-phase period TP to the transition of the output signal of the exclusive NOR circuit 25. In addition, the latch 26 latches the time code TC at a transition timing of the output signal of the exclusive NOR circuit 25 in the D-phase period TD to thereby acquire time (a code value CD) from a start of the D-phase period TD to the transition of the output signal of the exclusive NOR circuit 25. The latch 26 then supplies these two code values CP and CD to the repeater 29. As illustrated in FIG. 4, the latch 26 is disposed on the semiconductor substrate 102.

The latch 26 includes a switch 27 and a holding circuit 28. The switch 27 is configured to be turned on in a case where the output signal of the exclusive NOR circuit 25 is at a high level, and to be turned off in a case where the output signal of the exclusive NOR circuit 25 is at a low level. The holding circuit 28 is configured to hold the time code TC of the plurality of bits supplied from the repeater 29. The holding circuit 28 is able to hold two time codes TC (the code values CP and CD).

In this way, the pixel circuit 20 generates the pixel signal SIG including the pixel voltage Vpix corresponding to the amount of received light, and performs AD conversion on the basis of the pixel signal SIG to thereby generate the code values CP and CD.

The repeater 29 (FIGS. 3 and 4) is configured to supply the time code TC supplied from the time code generator 13 to the latches 26 of the plurality of pixels P belonging to the cluster CL during the P-phase period TP and the D-phase period TD. In addition, after the end of the P-phase period TP and the D-phase period TD, the repeater 29 supplies the code values CIP and CD supplied from the latches 26 to the signal processor 16. The repeater 29 is coupled to the latches 26 via bus wiring lines having a bit width of a plurality of bits. As illustrated in FIG. 4, the repeater 29 is disposed on the semiconductor substrate 102.

The reference signal generator 12 (FIG. 1) is configured to generate the reference signal REF on the basis of a command from the timing generator 17. The reference signal REF has what is called a ramp waveform in which a voltage level gradually changes with a lapse of time during the P-phase period TP and the D-phase period TD. In addition, the reference signal generator 12 supplies the generated reference signal REF to the plurality of pixel circuits 20 in the pixel array 11. As illustrated in FIG. 4, the reference signal generator 12 is disposed on the semiconductor substrate 102.

The time code generator 13 is configured to generate the time code TC on the basis of a command from the timing generator 17. The time code TC is a code of a plurality of bits that changes with a lapse of time, and may be, for example, a gray code. In addition, the time code generator 13 supplies the generated time code TC to the repeaters 29 in the plurality of clusters CL. The time code generator 13 is disposed on the semiconductor substrate 102 (FIG. 2), for example.

The bias generator 14 is configured to generate various bias voltages and bias currents to be used in the imaging device 1. For example, the bias generator 14 generates the bias voltage Vb and supplies the bias voltage Vb to the comparator circuit 22 of the pixel P.

The pixel driver 15 is configured to control operations of the plurality of pixel circuits 20 in the pixel array 11. Specifically, the pixel driver 15 generates the control signals OFG, TX, RST, FVA, FVB, and XWR, supplies the control signals OFG, TX, RST, and XWR to the pixel circuits 20, supplies the control signal FVA to the pixel circuit 20 corresponding to the pixel PA, and supplies the control signal FVB to the pixel circuit 20 corresponding to the pixel PB, thereby controlling the operations of the pixel circuits 20. For example, the pixel driver 15 supplies one control signal OFG, TX, or RST to all the pixels P in the pixel array 11. In addition, for example, the pixel driver 15 supplies one control signal FVA to all the pixels PA in the pixel array 11, and supplies one control signal FVB to all the pixels PB in the pixel array 11. In addition, the pixel driver 15 supplies a plurality of control signals XWR different from each other to the respective pixels P in the cluster CL. For example, the pixel driver 15 supplies one control signal XWR to the pixels P located at the same position in all the clusters CL. The pixel driver 15 is disposed on the semiconductor substrate 102 (FIG. 2), for example.

The signal processor 16 is configured to generate an image signal Spic by performing predetermined image processing on the basis of the code values CP and CD generated by each of the plurality of pixel circuits 20. Examples of the predetermined image processing include processing for generating a pixel value with use of the principle of correlated double sampling (CDS; Correlated Double Sampling) on the basis of the two code values CP and CD, and black level correction processing for correcting a black level. The signal processor 16 is disposed on the semiconductor substrate 102 (FIG. 2), for example.

The timing generator 17 is configured to control an operation of the imaging device 1 by generating various timing signals and supplying the various generated timing signals to the reference signal generator 12, the time code generator 13, the pixel driver 15, and the signal processor 16. The timing generator 17 is disposed on the semiconductor substrate 102 (FIG. 2), for example.

FIG. 7 illustrates an example of implementation of the imaging device 1. As illustrated in FIG. 2, the imaging device 1 is formed on the two semiconductor substrates 101 and 102. The pixel array 11 is disposed in each of a region R11 of the semiconductor substrate 101 and a region R12 of the semiconductor substrate 102. As illustrated in FIGS. 2 and 4, the wiring lines 103 are provided between the region R11 of the semiconductor substrate 101 and the region R12 of the semiconductor substrate 102. This allows a circuit formed on the semiconductor substrate 101 and a circuit formed on the semiconductor substrate 102 to be coupled to each other by the wiring lines 103. The bias generator 14 is disposed in a region R14 of the semiconductor substrate 101. The reference signal generator 12 and the pixel driver 15 are disposed in a region R15 of the semiconductor substrate 102. As illustrated in FIG. 2, the wiring lines 103 are provided between the region R10 of the semiconductor substrate 101 and the region R15 of the semiconductor substrate 102. This allows the reference signal REF generated by the reference signal generator 12 and the control signals OFG, TX, and RST generated by the pixel driver 15 to be supplied to the semiconductor substrate 101 via the wiring lines 103. The signal processor 16 is disposed in a region R16 of the semiconductor substrate 101.

Here, the pixel circuit 20 corresponds to a specific example of a "first pixel circuit" and a "second pixel circuit" in the present disclosure. The light-receiving circuit 21 corresponds to a specific example of a "first light-receiving circuit" and a "second light-receiving circuit" in the present disclosure. The comparator 23 corresponds to a specific example of a "first comparator" and a "second comparator" in the present disclosure. The signal CMP corresponds to a specific example of a "first comparison signal" and a "second comparison signal" in the present disclosure. The control circuit 24 corresponds to a specific example of a "first control circuit" and a "second control circuit" in the present disclosure. The signal VCO corresponds to a specific example of a "first comparison output signal" and a "second comparison output signal" in the present disclosure. The latch 26 corresponds to a specific example of a "first latch circuit" and a "second latch circuit" in the present disclosure. The time code TC corresponds to a specific example of a "time code" in the present disclosure. The pixel driver 15 corresponds to a specific example of a "generation circuit" in the present disclosure.

[Operation and Workings]

Next, a description is given of the operation and workings of the imaging device 1 according to the present embodiment.

(Overview of Overall Operation)

First, an overview of an overall operation of the imaging device 1 will be described with reference to FIGS. 1, 3, and 4. The reference signal generator 12 generates the reference signal REF. The time code generator 13 generates the time code TC. The repeater 29 supplies the time code TC to the latches 26 of the plurality of pixels P belonging to the cluster CL. The pixel driver 15 controls the operations of the plurality of pixel circuits 20 in the pixel array 11. Each of the plurality of pixel circuits 20 in the pixel array 11 generates the pixel signal SIG including the pixel voltage Vpix corresponding to the amount of received light, and performs AD conversion on the basis of the pixel signal SIG to thereby generate the code values CP and CD. The repeater 29 supplies the code values CP and CD to the signal processor 16. The signal processor 16 generates the image signal Spic by performing predetermined image processing on the basis of the code values CP and CD generated by each of the plurality of pixel circuits 20. The timing generator 17 generates various timing signals and supplies the various generated timing signals to the reference signal generator 12, the time code generator 13, the pixel driver 15, and the signal processor 16, thereby controlling the operation of the imaging device 1.

(Detailed Operation)

In each of the plurality of pixel circuits 20 in the pixel array 11, on the basis of the control signal OFG, the transistor MN1 is turned on to cause electric charge accumulated in the photodiode PD to be discharged. The transistor MN1 is then turned off to start the exposure period, and electric charge in an amount corresponding to the amount of received light is accumulated in the photodiode PD. Then, after the exposure period ends, the pixel circuit 20 performs AD conversion on the basis of the pixel signal SIG including the reset voltage Vreset and the pixel voltage Vpix. In the following, with attention focused on the pixel circuit 20 (pixel circuit 20A) to be supplied with the control signal VFA, a detailed description will be given of the AD conversion in the pixel circuit 20A.

FIG. 8 illustrates an operation example of the AD conversion in the pixel circuit 20A, in which (A) represents a waveform of the control signal RST, (B) represents a waveform of the control signal TX, (C) represents a waveform of the reference signal REF, (D) represents a waveform of the pixel signal SIG, (E) represents a waveform of the signal CMP, (F) represents a waveform of the control signal VFA, (C) represents a waveform of the signal VCO (signal VCOA) generated by the comparator circuit 22, (H) represents an operation of the holding circuit 28 (holding circuit 28A) in the pixel circuit 20A, and (I) represents a waveform of the control signal XWR. In (C) and (D) of FIG. 8, the waveforms of the reference signal REF and the pixel signal SIG are presented on the same voltage axis.

First, at a timing t11, the pixel driver 15 changes the control signal FVA from a high level to a low level ((F) of FIG. 8).

In addition, at the timing t11, the reference signal generator 12 changes the voltage of the reference signal REF to the reset voltage Vreset ((C) of FIG. 8). In addition, at the timing t11, the pixel driver 15 changes the control signal RST from a low level to a high level ((A) of FIG. 8). Thus, in the pixel circuit 20A, the transistor MN3 is turned on, the floating diffusion FD is reset, and the voltage of the pixel signal SIG is set to the reset voltage Vreset ((D) of FIG. 8). Then, after a lapse of a predetermined time from the timing t11, the pixel driver 15 changes the control signal RST from the high level to the low level ((A) of FIG. 8). This turns off the transistor MN3.

Next, at a timing t12, the reference signal generator 12 changes the voltage of the reference signal REF from the reset voltage Vreset to a voltage V1 ((C) of FIG. 8). This causes the voltage of the reference signal REF to be higher than the voltage of the pixel signal SIG. Thus, the comparator 23 sets the signal CMP to the high level ((E) of FIG. 8). Because the control signal FVA is at the low level ((F) of FIG. 8), the control circuit 24 sets the signal VCOA to a high level ((G) of FIG. 8) on the basis of the signal CMP. Because the control signal XWR is at a high level ((I) of FIG. 8), an output voltage of the exclusive NOR circuit 25 becomes a high level. This turns on the switch 27 of the latch 26.

Next, during a period from a timing t13 to a timing t15 (the P-phase period TP), the pixel circuit 20A performs AD conversion on the basis of the voltage (reset voltage Vreset) of the pixel signal SIG. Specifically, at the timing t13, the reference signal generator 12 starts to decrease the voltage of the reference signal REF at a predetermined change rate from the voltage V1 ((C) of FIG. 8). In addition, at the timing t13, the time code generator 13 starts an increment operation on the time code TC. The repeater 29 supplies the time code TC to the latch 26. The holding circuit 28A is thereby supplied with the time code TC ((HI) of FIG. 8) that changes with a lapse of time. In (H) of FIG. 8, shading indicates that data at the holding circuit 28A is changing.

Then, at a timing t14, the voltage of the reference signal REF falls below the voltage (reset voltage Vreset) of the pixel signal SIG ((C) and (D) of FIG. 8). Accordingly, the comparator 23 changes the signal CMP from the high level to the low level ((E) of FIG. 8). Because the control signal FVA is at the low level ((F) of FIG. 8), the control circuit 24 changes the signal VCOA from the high level to the low level ((G) of FIG. 8) in accordance with the signal CMP. Because the control signal XWR is at the high level (( ) of FIG. 8), the output voltage of the exclusive NOR circuit 25 changes from the high level to the low level. This changes the switch 27 of the latch 26 from an on-state to an off-state. As a result, supply of the time code TC to the holding circuit 28A is stopped ((H) of FIG. 8), and the holding circuit 28A holds the time code TC at the time when the switch 27 of the latch 26 has changed from the on-state to the off-state. In this way, the latch 26 latches the time code TC on the basis of transition of the signal VCOA. The code value CP of the time code TC latched by the latch 26 is a code value corresponding to the length of time from the timing t13 to the timing t14, as well as a code value corresponding to the reset voltage Vreset.

Then, at the timing t15, the reference signal generator 12 stops changing the voltage of the reference signal REF ((C) of FIG. 8) at the end of the P-phase period TP, and the time code generator 13 ends the increment operation on the time code TC.

In addition, at the timing t15, the pixel driver 15 changes the control signal FVA from the low level to the high level ((F) of FIG. 8).

Next, at a timing t16, the pixel driver 15 changes the control signal FVA from the high level to the low level ((F) of FIG. 8).

In addition, at the timing t16, the reference signal generator 12 changes the voltage of the reference signal REF to the voltage V1 ((C) of FIG. 8). This causes the voltage of the reference signal REF to be higher than the voltage of the pixel signal SIG. Thus, the comparator 23 sets the signal CMP to the high level ((E) of FIG. 8). Because the control signal FVA is at the low level ((F) of FIG. 8), the control circuit 24 sets the signal VCOA to the high level ((G) of FIG. 8) on the basis of the signal CMP. Because the control signal XWR is at the high level ((I) of FIG. 8), the output voltage of the exclusive NOR circuit 25 becomes the high level. This turns on the switch 27 of the latch 26.

In addition, at the timing t16, the pixel driver 15 changes the control signal TX from the low level to the high level ((B) of FIG. 8). Thus, in the pixel circuit 20A, the transistor MN2 is turned on, electric charge generated in the photodiode P) is transferred to the floating diffusion FD, and the voltage of the pixel signal SIG is changed to the pixel voltage Vpix ((D) of FIG. 8). Then, after a lapse of a predetermined time from the timing t16, the pixel driver 15 changes the control signal TX from the high level to the low level ((B) of FIG. 8). This turns off the transistor MN2.

Next, during a period from a timing t17 to a timing t19 (the D-phase period TD), the pixel circuit 20A performs AD conversion on the basis of the voltage (pixel voltage Vpix) of the pixel signal SIG. Specifically, at the timing t17, the reference signal generator 12 starts to decrease the voltage of the reference signal REF at a predetermined change rate from the voltage V1 ((C) of FIG. 8). In addition, at the timing t17, the time code generator 13 starts the increment operation on the time code TC. The repeater 29 supplies the time code TC to the latch 26. The holding circuit 28A of the latch 26 is thereby supplied with the time code TC ((H) of FIG. 8) that changes with a lapse of time.

Then, at a timing t18, the voltage of the reference signal REF falls below the voltage (pixel voltage Vpix) of the pixel signal SIG ((C) and (D) of FIG. 8). Accordingly, the comparator 23 changes the signal CMP from the high level to the low level ((E) of FIG. 8). Because the control signal FVA is at the low level ((F) of FIG. 8), the control circuit 24 changes the signal VCOA from the high level to the low level ((G) of FIG. 8) in accordance with the signal CMP. Because the control signal XWR is at the high level ((I) of FIG. 8), the output voltage of the exclusive NOR circuit 25 changes from the high level to the low level. This changes the switch 27 of the latch 26 from the on-state to the off-state. As a result, supply of the time code TC to the holding circuit 28A is stopped ((H) of FIG. 8), and the holding circuit 28A holds the time code TC at the time when the switch 27 of the latch 26 has changed from the on-state to the off-state. In this way, the latch 26 latches the time code TC on the basis of the transition of the signal VCOA. The code value CD of the time code TC latched by the latch 26 is a code value corresponding to the length of time from the timing t17 to the timing t18, as well as a code value corresponding to the pixel voltage Vpix.

Then, at the timing t19, the reference signal generator 12 stops changing the voltage of the reference signal REF ((C) of FIG. 8) at the end of the D-phase period TD, and the time code generator 13 ends the increment operation on the time code TC.

In addition, at the timing (19, the pixel driver 15 changes the control signal FVA from the low level to the high level ((F) of FIG. 8).

Then, during a period from a timing t20 to a timing t21, the pixel driver 15 sequentially selects the plurality of pixel circuits 20 in the cluster CL using the control signal XRW.

Because the signal VCOA is at the low level ((G) of FIG. 8), the exclusive NOR circuit 25 sets the output signal to the high level when the control signal XRW becomes the low level. This turns on the switch 27 of the latch 26, and the latch 26 supplies the code values CP and CD held by the holding circuit 28A to the repeater 29. The repeater 29 supplies the code values CIP and CD generated by the pixel circuit 20 to the signal processor 16. In this way, the pixel driver 15 sequentially selects the plurality of pixel circuits 20 in the cluster CL using the control signal XRW. Accordingly, the plurality of pixel circuits 20 sequentially supplies the code values CP and CD to the repeater 29, and the repeater 29 sequentially supplies these code values CF and CD to the signal processor 16.

The signal processor 16 performs predetermined image processing on the basis of the code values CP and CD generated by each of the plurality of pixel circuits 20. For example, the signal processor 16 generates a pixel value with use of the principle of correlated double sampling on the basis of the code value CP and the code value CD. Specifically, the signal processor 16 generates the pixel value by subtracting the code value CP from the code value CD, for example. In addition, the signal processor 16 performs black level correction processing for correcting a black level, and the like. In this way, the signal processor 16 generates the image signal Spic.

The imaging device 1 repeats such operations performed during the period from the timing t11 to the timing t21. This applies similarly to a period from the timing t21 onward. Here, the D-phase period TD corresponds to a specific example of a "comparison period" in the present disclosure. The period from the timing t11 to the timing t21 corresponds to a specific example of an "operation period" in the present disclosure. In this example, the voltage of the pixel voltage Vpix is made lower than a lower limit of a voltage range of the reference signal REF during a period from the timing t21 to a timing t30. The description will proceed further to operations in this case.

First, at the timing t21, the pixel driver 15 changes the control signal FVA from the high level to the low level ((F) of FIG. 8). In addition, at the timing t21, the reference signal generator 12 changes the voltage of the reference signal REF to the reset voltage Vreset ((C) of FIG. 8). In addition, at the timing t21, the pixel driver 15 changes the control signal RST from the low level to the high level ((A) of FIG. 8). Thus, in the pixel circuit 20A, the voltage of the pixel signal SIG changes to the reset voltage Vreset ((D) of FIG. 8). Then, after a lapse of a predetermined time from the timing t21, the pixel driver 15 changes the control signal RST from the high level to the low level ((A) of FIG. 8).

Next, at a timing t22, the reference signal generator 12 changes the voltage of the reference signal REF from the reset voltage Vreset to the voltage V1 ((C) of FIG. 8). Thus, the comparator 23 sets the signal CMP to the high level ((E) of FIG. 8). Because the control signal FVA is at the low level ((F) of FIG. 8), the control circuit 24 sets the signal VCOA to the high level ((i) of FIG. 8) on the basis of the signal CMP. This turns on the switch 27 of the latch 26.

Next, during a period from a timing t23 to a timing t25 (the P-phase period TP), the pixel circuit 20A performs AD conversion on the basis of the voltage (reset voltage Vreset) of the pixel signal SIG. This operation is similar to the operation performed during the period from the timing t13 to the timing t15.

In this example, at a timing t24, the voltage of the reference signal REF falls below the voltage (reset voltage Vreset) of the pixel signal SIG ((C) and (D) of FIG. 8).

Accordingly, the comparator 23 changes the signal CMP from the high level to the low level ((E) of FIG. 8). Because the control signal FVA is at the low level ((F) of FIG. 8), the control circuit 24 changes the signal VCOA from the high level to the low level ((G) of FIG. 8) in accordance with the signal CMP. Accordingly, the switch 27 of the latch 26 changes from the on-state to the off-state. In this way, the latch 26 latches the time code TC on the basis of the transition of the signal VCOA and holds the code value CP.

Then, at the timing t25, the pixel driver 15 changes the control signal FVA from the low level to the high level ((F) of FIG. 8).

Next, at a timing t26, the pixel driver 15 changes the control signal FVA from the high level to the low level ((F) of FIG. 8).

In addition, at the timing t26, the reference signal generator 12 changes the voltage of the reference signal REF to the voltage V1 ((C) of FIG. 8). Accordingly, the comparator 23 sets the signal CMP to the high level ((E) of FIG. 8). Because the control signal FVA is at the low level ((F) of FIG. 8), the control circuit 24 sets the signal VCOA to the high level ((G) of FIG. 8) on the basis of the signal CMP. This turns on the switch 27 of the latch 26.

In addition, at the timing t26, the pixel driver 15 changes the control signal TX from the low level to the high level ((B) of FIG. 8). Thus, in the pixel circuit 20A, the voltage of the pixel signal SIG is changed to the pixel voltage Vpix ((D) of FIG. 8). Then, after a lapse of a predetermined time from the timing t26, the pixel driver 15 changes the control signal TX from the high level to the low level ((B) of FIG. 8).

Next, during a period from a timing t27 to a timing t28 (the D-phase period TD), the pixel circuit 20A performs AD conversion on the basis of the voltage (pixel voltage Vreset) of the pixel signal SIG. This operation is similar to the operation performed during the period from the timing t17 to the timing t19.

In this example, the pixel voltage Vpix is lower than the lower limit of the voltage range of the reference signal REF ((D) of FIG. 8). Accordingly, the comparator 23 keeps the signal CMP at the high level during the period from the timing t27 to the timing t28 ((E) of FIG. 8). Because the control signal FVA is at the low level ((F) of FIG. 8), the control circuit 24 keeps the signal VCOA at the high level ((G) of FIG. 8).

Then, at the timing t28 at which the D-phase period TD ends, the pixel driver 15 changes the control signal FVA from the low level to the high level ((F) of FIG. 8). Because the signal CMP is at the high level ((E) of FIG. 8), the control circuit 24 changes the signal VCOA from the high level to the low level ((G) of FIG. 8) on the basis of the control signal FVA. The switch 27 of the latch 26 changes from the on-state to the off-state on the basis of the signal VCOA. In this way, in the imaging device 1, even in a case where the pixel voltage Vpix is lower than the lower limit of the voltage range of the reference signal REF, the signal VCOA changes from the high level to the low level, and the switch 27 changes from the on-state to the off-state on the basis of the signal VCOA. In such a manner, the latch 26 latches the time code TC on the basis of the transition of the signal VCOA and holds the code value CD.

Then, during a period from a timing t29 to the timing t30, the pixel driver 15 sequentially selects the plurality of pixel circuits 20 in the cluster CL using the control signal XRW. Thus, the plurality of pixel circuits 20 sequentially supplies the code values CIP and CD to the repeater 29, and the repeater 29 sequentially supplies these code values CP and CD to the signal processor 16.

The signal processor 16 performs predetermined image processing on the basis of the code values CP and CD generated by each of the plurality of pixel circuits 20.

(About Operation Modes M)

Next, operation modes of the imaging device 1 will be described. The imaging device 1 has two operation modes M (operation modes MA and MB). In the operation mode MA, the imaging device 1 performs an imaging operation by operating all the pixels P in the pixel array 11. In the operation mode MB, the imaging device 1 performs the imaging operation by operating the pixels P in one row in every two rows. Specifically, in the operation mode MB, the imaging device 1 is able to operate the pixel PA to which the control signal FVA is to be supplied and refrain from operating the pixel PB to which the control signal FVB is to be supplied. It is to be noted that this is not limitative, and alternatively, the imaging device 1 may operate the pixel PB to which the control signal FVB is to be supplied and refrain from operating the pixel PA to which the control signal FVA is to be supplied.

Next, with attention focused on one of the plurality of pixel circuits 20 (pixel circuit 20A) to which the control signal VFA is to be supplied and one of the plurality of pixel circuits 20 (pixel circuit 20B) to which the control signal VFB is to be supplied, a description will be given of operations of these pixel circuits 20A and 20B in the operation modes MA and MB.

Figure 9:
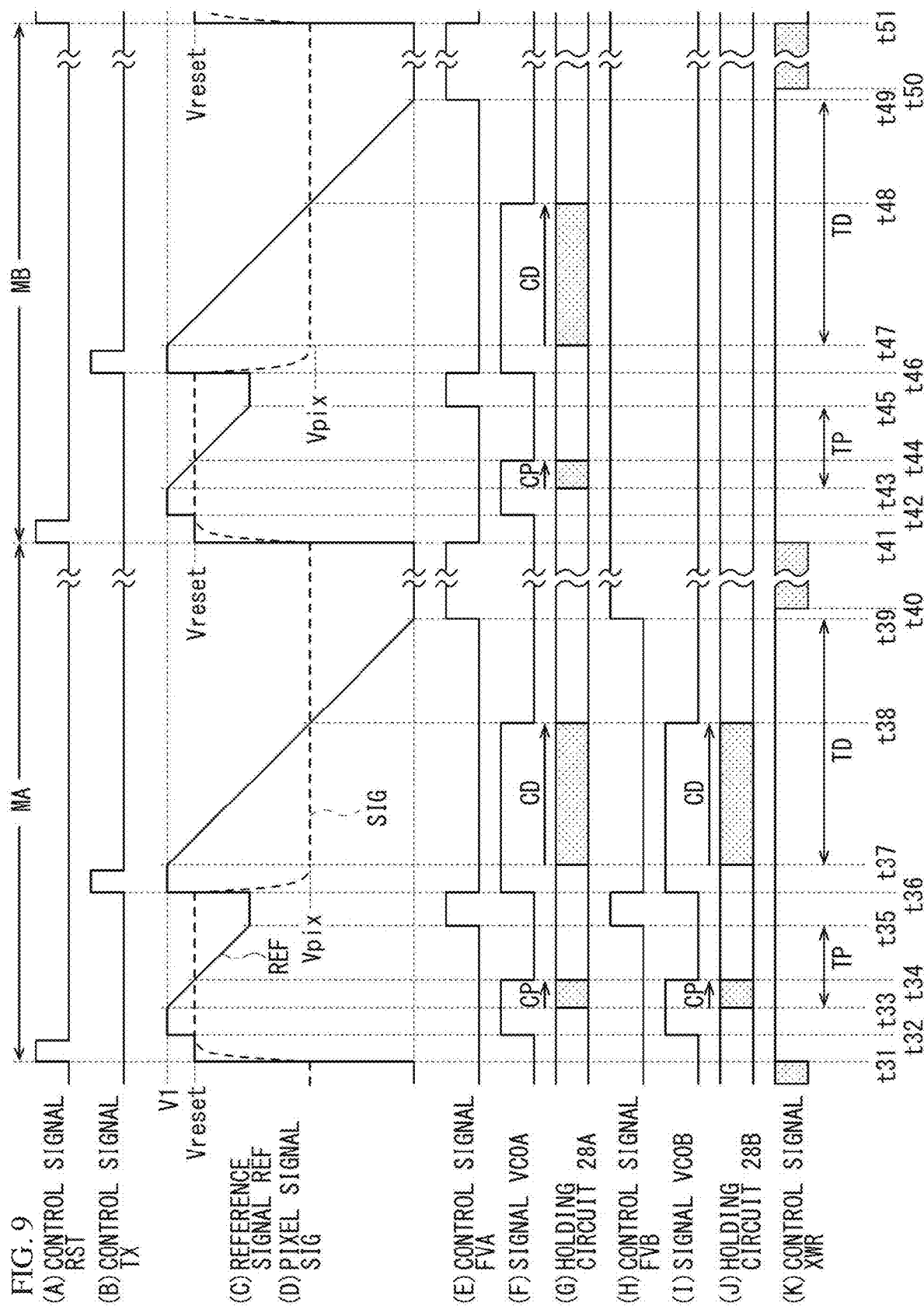
FIG. 9 is another timing waveform diagram illustrating an operation example of the pixel circuit illustrated in FIG. 4.

FIG. 9 illustrates an operation example of AD conversion in the pixel circuits 20A and 20B, in which (A) represents the waveform of the control signal RST, (B) represents the waveform of the control signal TX, (C) represents the waveform of the reference signal REF, (D) represents the waveform of the pixel signal SIG in the pixel circuits 20A and 20B, (E) represents the waveform of the control signal VFA to be supplied to the pixel circuit 20A, (F) represents the waveform of the signal VCO (signal VCOA) in the pixel circuit 20A, (G) represents the operation of the holding circuit 28 (holding circuit 28A) in the pixel circuit 20A, (H) represents the waveform of the control signal VFB to be supplied to the pixel circuit 20B, (I) represents the waveform of the signal VCO (signal VCOB) in the pixel circuit 20B, (J) represents the operation of the holding circuit 28 (holding circuit 28B) in the pixel circuit 20B, and (K) represents the waveform of the control signal XWR in the pixel circuits 20A and 20B. It is to be noted that the waveform of the pixel signal SIG in the pixel circuit 20A and the waveform of the pixel signal SIG in the pixel circuit 20B may be different; however, for convenience of description, the respective pixel signals SIG are illustrated as one pixel signal SIG in (D) of FIG. 9. This applies similarly to the control signal XWR ((K) of FIG. 9).

Operations during a period from a timing t31 to a timing t41 represent operations in the operation mode MA, and operations during a period from the timing t41 to a timing t51 represent operations in the operation mode MB.

In the operation mode MA (the timing t31 to the timing t41), the pixel driver 15 generates the control signals VFA and VFB ((E) and (H) of FIG. 9) similar to the control signal FVA illustrated in FIG. 8 ((F) of FIG. 8). Thus, each of the pixel circuits 20A and 20B performs AD conversion. Thus, in the imaging device 1, all the pixels P perform AD conversion.

In the operation mode MB (the timing t41 to the timing t51), the pixel driver 15 generates the control signal VFA similar to the control signal FVA illustrated in FIG. 8 ((F) of FIG. 8), and generates the control signal VFB that is to be kept at the high level ((E) and (HI) of FIG. 9). Thus, the pixel circuit 20A performs AD conversion, and the pixel circuit 20B does not perform AD conversion.

Specifically, during a period from a timing t43 to a timing t45 (the P-phase period TP), the pixel circuit 20A performs AD conversion on the basis of the voltage (reset voltage Vreset) of the pixel signal SIG of the pixel circuit 20A, and during a period from a timing t47 to a timing t49 (the D-phase period TD), the pixel circuit 20A performs AD conversion on the basis of the voltage (pixel voltage Vpix) of the pixel signal SIG of the pixel circuit 20A. During the P-phase period TP, the time code TC is supplied to the holding circuit 28A over a period from the timing t43 to a timing t44; and during the D-phase period TD, the time code TC is supplied to the holding circuit 28A over a period from the timing t47 to a timing t48. The time code TC changes with a lapse of time, and the time code TC is thus written into the holding circuit 28A at every change. Accordingly, the holding circuit 28A consumes electric power with changes of the time code TC.

In contrast, in the pixel circuit 20B, the control signal FVB is kept at the high level ((H) of FIG. 9), and the control circuit 24 thus keeps the signal VCOB at the low level ((I) of FIG. 9). Because the control signal XWR is at the high level ((K) of FIG. 9), the output voltage of the exclusive NOR circuit 25 is kept at the low level. Accordingly, the switch 27 is kept in the off-state, and thus no AD conversion is performed. In this way, in a case where the switch 27 is kept in the off-state, the time code TC is not supplied to the holding circuit 28B ((J) of FIG. 26), and the holding circuit 28B thus consumes no electric power even if the time code TC changes.

In this way, in the operation mode MB, the pixel circuit 20A performs AD conversion, whereas the pixel circuit 20B does not perform AD conversion. The imaging device 1 is able to refrain from supplying the time code TC to the holding circuit 28 of the latch 26 in the pixel P that does not perform AD conversion. In this example, as illustrated in FIG. 5, the pixels P in one row in every two rows are operated, and accordingly, the time code TC is not supplied to the holding circuits 28 of half of all the pixels P. This makes it possible for the imaging device 1 to reduce power consumption.

The imaging device 1 is provided with the pixel circuit 20 including: the light-receiving circuit 21 configured to generate the pixel signal SIG corresponding to the amount of received light; the comparator 23 configured to generate the comparison signal (signal CMP) by comparing the pixel signal SIC with the reference signal REF having the ramp waveform; the control circuit 24 configured to generate the comparison output signal (signal VCO) by turning on and off the output of the comparison signal (signal CMP) on the basis of the control signal FV; and the latch 26 configured to latch the time code TC on the basis of the transition of the comparison output signal (signal VCO). The control circuit 24 is configured to generate the first comparison output signal by selectively switching a second operation of outputting the comparison output signal (signal VCO) by selectively switching between a first operation of outputting the comparison output signal (signal VCO) corresponding to the comparison signal (signal CMP) and a second operation of outputting the comparison output signal (signal VCO) indicating a low-level signal, on the basis of the control signal FV, for example. Thus, for example, in a case where the control circuit 24 outputs the signal VCO corresponding to the signal CMP on the basis of the control signal FV, the latch 26 is able to latch the time code TC on the basis of the transition of the signal VCO. In addition, in a case where the control circuit 24 outputs the signal VCO that is at the low level on the basis of the control signal FV, the signal VCO does not transition, which allows the latch 26 to refrain from operating. This makes it possible for the imaging device 1 to reduce power consumption.

[Effects]

As described above, in the present embodiment, the pixel circuit is provided that includes: the light-receiving circuit configured to generate the pixel signal corresponding to the amount of received light; the comparator configured to generate the comparison signal by comparing the pixel signal with the reference signal having the ramp waveform; the control circuit configured to generate the comparison output signal by turning on and off the output of the comparison signal on the basis of the control signal; and the latch configured to latch the time code on the basis of the transition of the comparison output signal. This make it possible to reduce power consumption.

Modification Example 1

In the foregoing embodiment, one of the control signals EVA and FVB is supplied to each of the plurality of pixel circuits 20; however, this is not limitative. Alternatively, for example, the two control signals FVA and FVB may be supplied to each of the plurality of pixel circuits 20, and one of the control signals FVA and FVB may be selected in the pixel circuit 20. The present modification example will be described in detail below.

Figure 10:
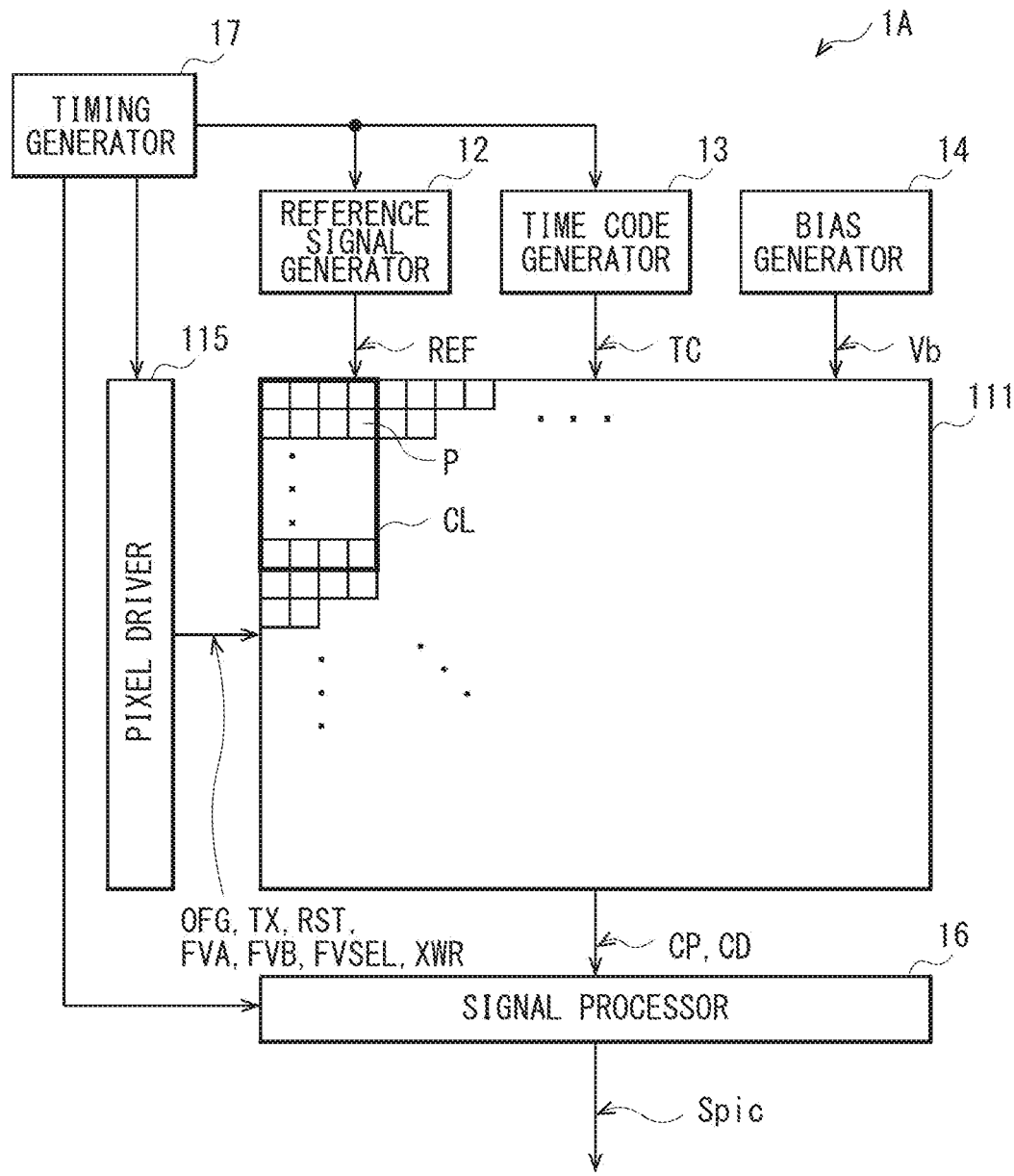
FIG. 10 is a block diagram illustrating a configuration example of an imaging device according to a modification example of the first embodiment.

FIG. 10 illustrates a configuration example of an imaging device 1A according to the present modification example. The imaging device 1A includes a pixel array 111 and a pixel driver 115.

Figure 11:
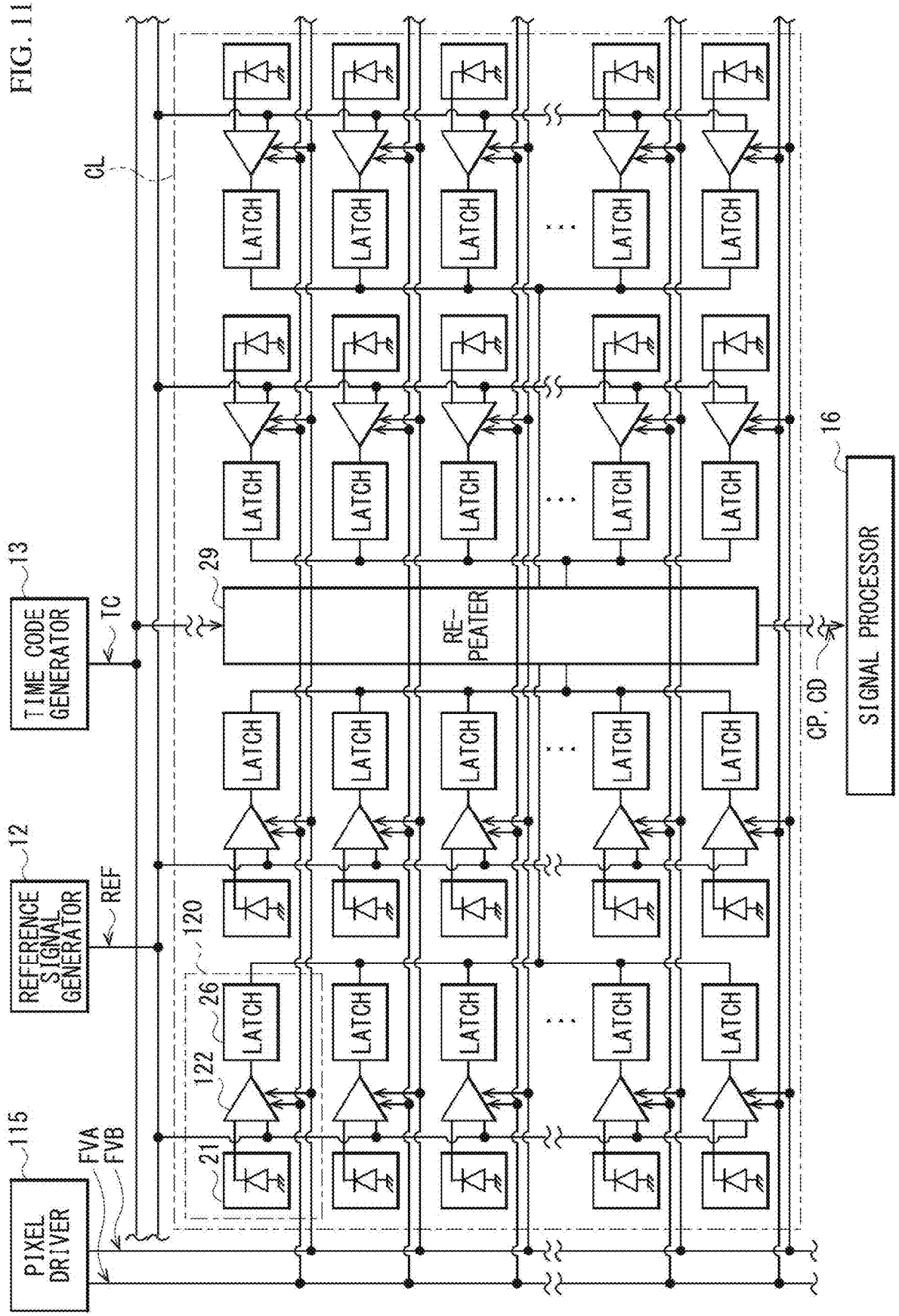
FIG. 11 is an explanatory diagram illustrating a configuration example of a cluster illustrated in FIG. 10.

FIG. 11 illustrates a configuration example of the cluster CL in the pixel array 111. The cluster CL includes a plurality of pixel circuits 120 corresponding to the respective pixels P, and the repeater 29. The pixel circuit 120 includes the light-receiving circuit 21, a comparator circuit 122, and the latch 26. The two control signals FVA and FVB are supplied to the comparator circuit 122. That is, in the pixel array 11 (FIG. 3) according to the foregoing embodiment, one of the control signals FVA and FVB is supplied to the comparator circuit 22, whereas in the pixel array 111 according to the present modification example, both of the control signals FVA and FVB are supplied to the comparator circuit 122.

Figure 12:
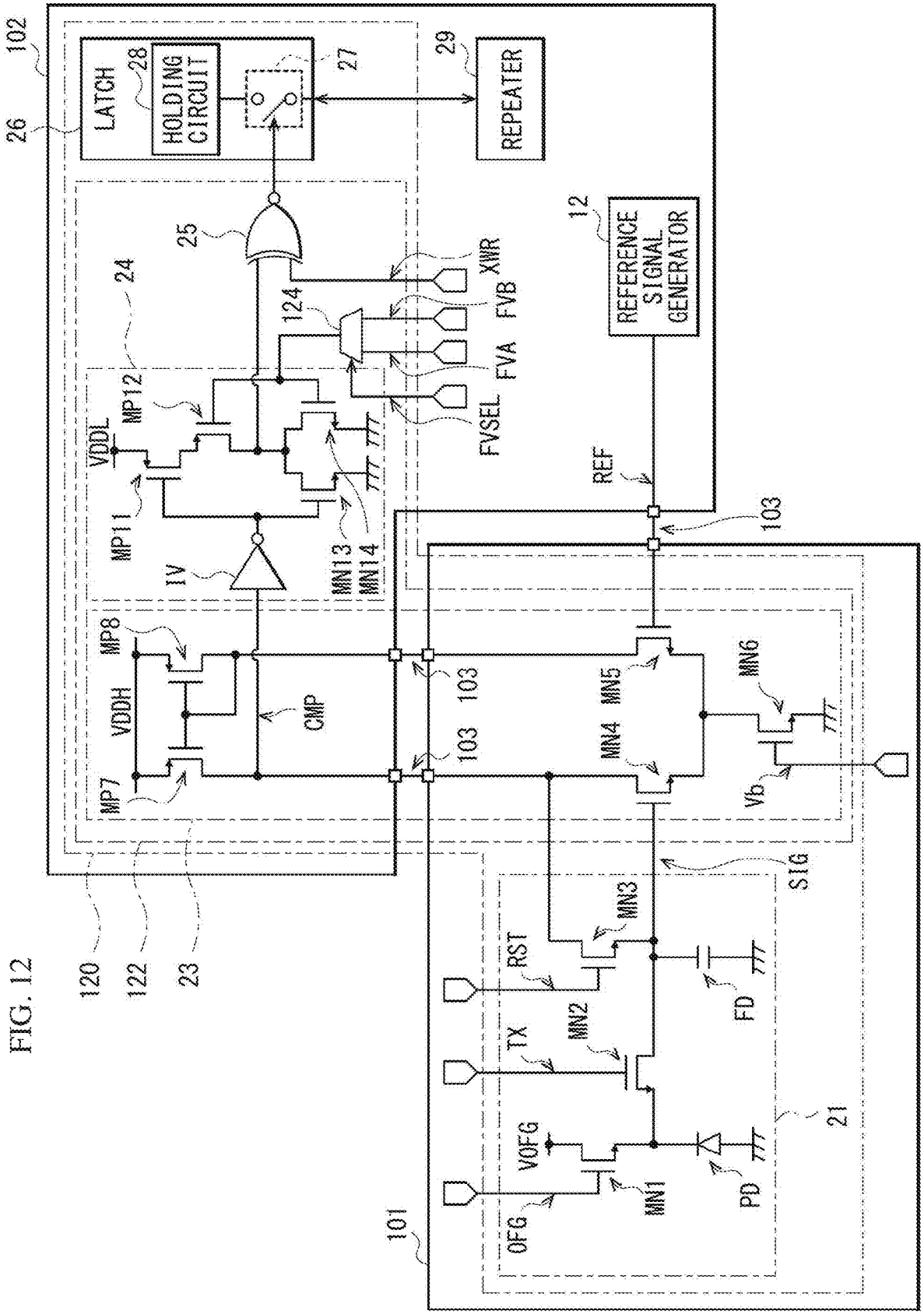
FIG. 12 is a circuit diagram illustrating a configuration example of a pixel circuit corresponding to a pixel illustrated in FIG. 10.

FIG. 12 illustrates a configuration example of the pixel circuit 120. The comparator circuit 122 of the pixel circuit 120 includes a selector 124. The selector 124 is configured to select one of the control signals FVA and FVB on the basis of a control signal FVSEL supplied from the pixel driver 115. The selector 124 then supplies the selected control signal to the gates of the transistors MP12 and MN14 of the control circuit 24. Here, the selector 124 corresponds to a specific example of a "selector" in the present disclosure.

The pixel driver 115 (FIGS. 10 and 11) is configured to control operations of the plurality of pixel circuits 120 in the pixel array 111. Specifically, the pixel driver 115 generates the control signals OFG, TX, RST, FVA, FVB, FVSEL, and XWR, and supplies these control signals OFG, TX, RST, FVA, FVB, FVSEL, and XWR to the pixel circuits 120 to thereby control the operations of the pixel circuits 120.

For example, the pixel driver 115 is able to supply the plurality of pixel circuits 120 with the respective control signals FVSEL corresponding to the pixel circuits 120. This makes it possible for the imaging device 1A to control which of the control signals FVA and FVB is to be supplied on a per-pixel-circuit-120 basis. In addition, for example, the plurality of pixel circuits 120 may be divided into groups, and the pixel driver 115 may supply a plurality of pixel groups with the respective control signals FVSEL corresponding to the plurality of pixel groups. This makes it possible for the imaging device 1A to control which of the control signals FVA and FVB is to be supplied on a per-pixel-group basis.

2. Second Embodiment

Next, an imaging device 2 according to a second embodiment will be described. In the present embodiment, the operation of the comparator of the pixel circuit 20 that does not perform AD conversion is stopped. It is to be noted that components substantially the same as those of the imaging device 1 according to the foregoing first embodiment are assigned with the same reference signs, and descriptions thereof are omitted as appropriate.

Figure 13:
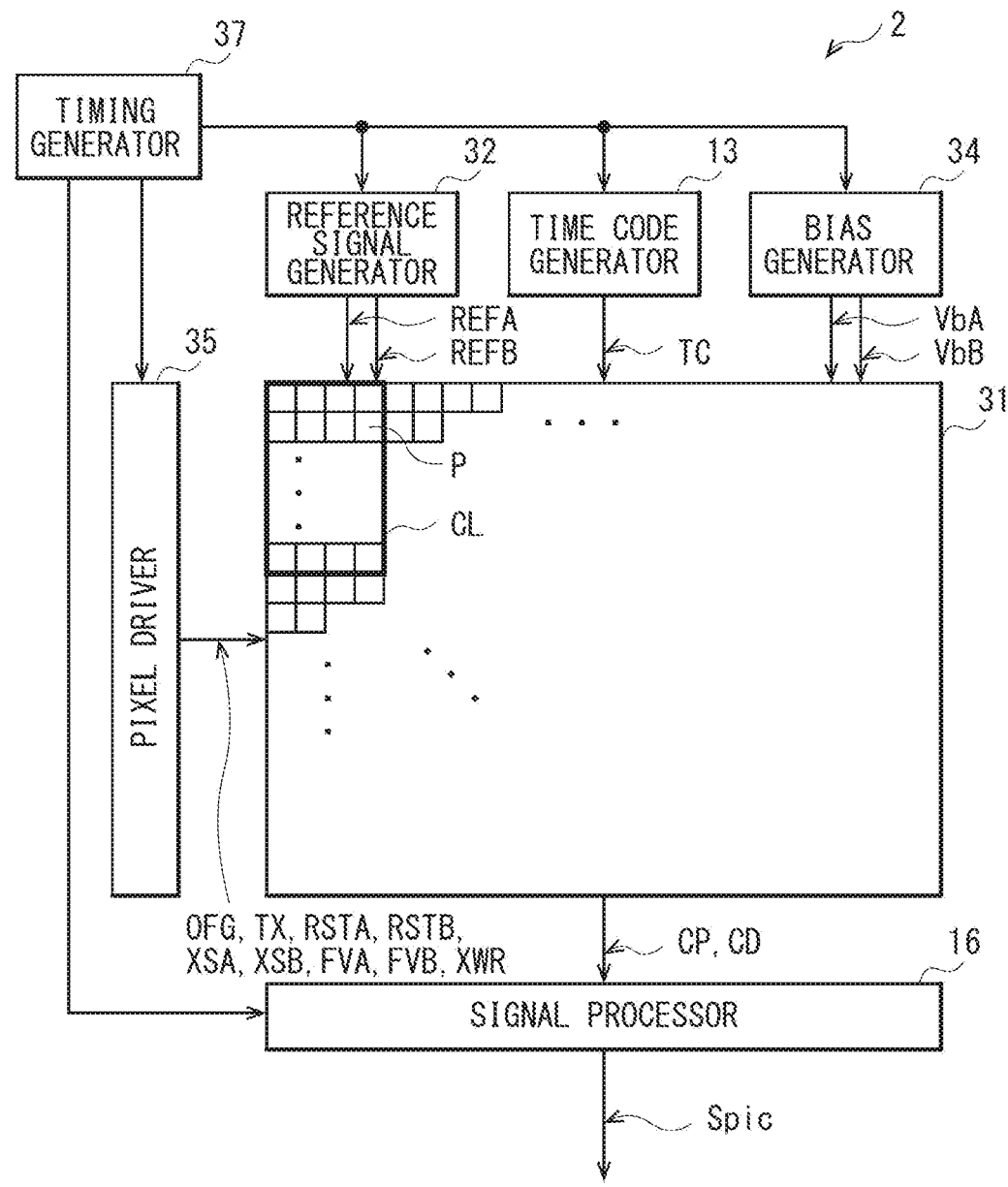
FIG. 13 is a block diagram illustrating a configuration example of an imaging device according to a second embodiment.

FIG. 13 illustrates a configuration example of the imaging device 2. The imaging device 2 includes a pixel array 31, a reference signal generator 32, a bias generator 34, a pixel driver 35, and a timing generator 37.

Figure 14:
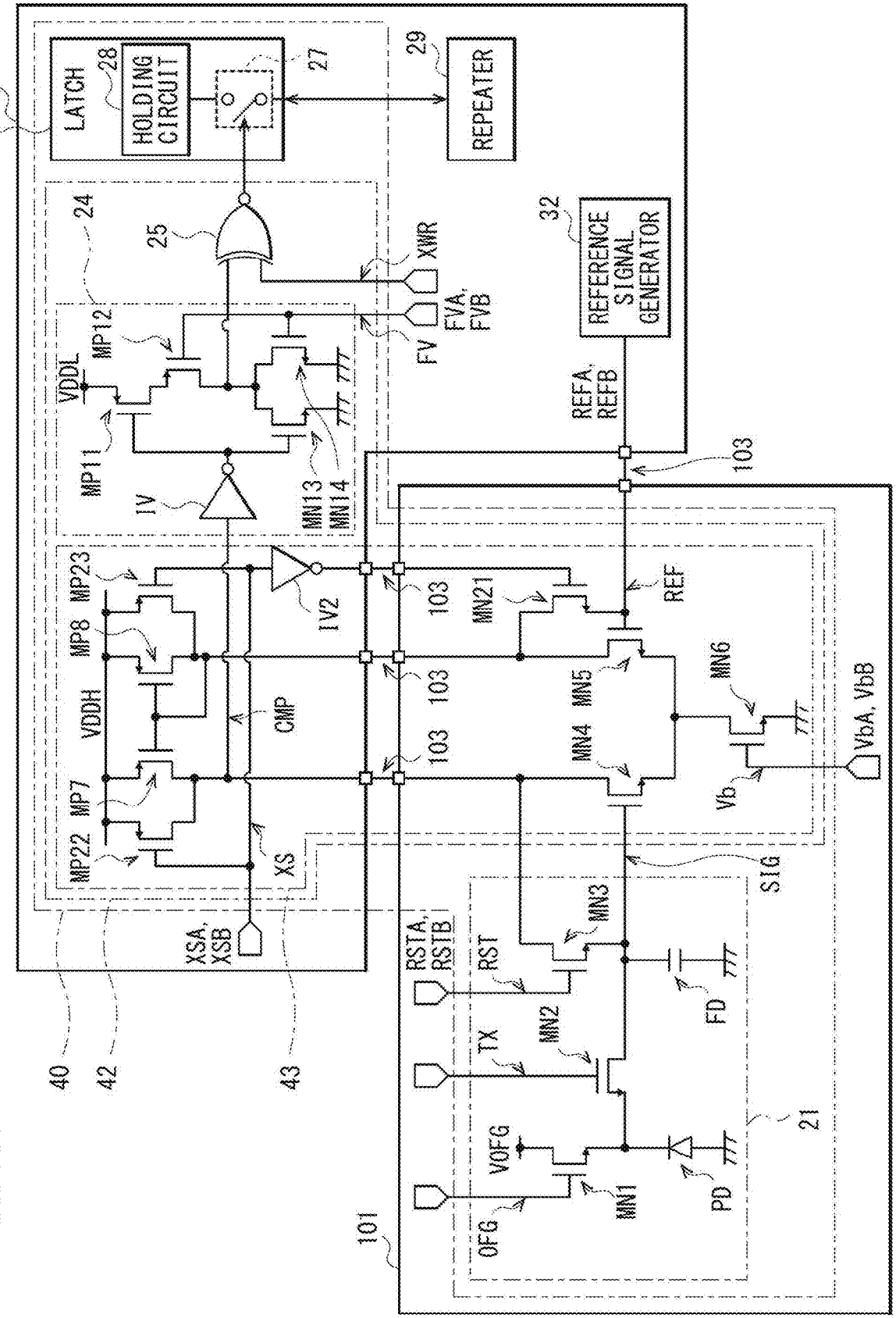
FIG. 14 is a circuit diagram illustrating a configuration example of a pixel circuit corresponding to a pixel illustrated in FIG. 13.

FIG. 14 illustrates a configuration example of a pixel circuit 40 in the pixel array 31. The pixel circuit 40 includes the light-receiving circuit 21, a comparator circuit 42, and the latch 26.

The transistor MN3 of the light-receiving circuit 21 has the gate to be supplied with the control signal RST (control signal RSTA or RSTB) from the pixel driver 35 (FIG. 13). Specifically, in the pixel circuit 40 corresponding to the pixel PA, the control signal RSTA is supplied to the gate of the transistor MN3; and in the pixel circuit 40 corresponding to the pixel PB, the control signal RSTB is supplied to the gate of the transistor MN3.

The comparator circuit 42 includes a comparator 43. The comparator 43 includes transistors MN21, MP22, MP23, and an inverter IV2. The transistor MN21 is an N-type MOS transistor. The transistors MP22 and MP23 are P-type MOS transistors.

The transistor MN21 has a gate coupled to an output terminal of the inverter IV2 via the wiring line 103 between the semiconductor substrates 101 and 102, a drain coupled to the drain of the transistor MN5, and a source coupled to the gate of the transistor MN5. The transistor MP22 has a gate to be supplied with a control signal XS (control signal XSA or XSB) from the pixel driver 35 (FIG. 13), a source to be supplied with the power supply voltage VDDH, and a drain coupled to the drain of the transistor MP7 and the input terminal of the inverter IV. The transistor MP23 has a gate to be supplied with the control signal XS (control signal XSA or XSB) from the pixel driver 35 (FIG. 13), a source to be supplied with the power supply voltage VDDH, and a drain coupled to the drain of the transistor MP8 and the gates of the transistors MP7 and MP8. The inverter IV2 has an input terminal to be supplied with the control signal XS (control signal XSA or XSB) from the pixel driver 35 (FIG. 13), and the output terminal coupled to the gate of the transistor MN21 via the wiring line 103 between the semiconductor substrates 101 and 102. Specifically, in the pixel circuit 40 corresponding to the pixel PA, the control signal XSA is supplied to the gates of the transistors MP22 and MP23 and the gate of the inverter IV2; and in the pixel circuit 40 corresponding to the pixel PB, the control signal XSB is supplied to the gates of the transistors MP22 and MP23 and the gate of the inverter IV2.

In addition, the transistor MN5 has the gate to be supplied with the reference signal REF (reference signal FEFA or REFB) from the reference signal generator 32 (FIG. 13). Specifically, in the pixel circuit 40 corresponding to the pixel PA, the reference signal REFA is supplied to the gate of the transistor MN5; and in the pixel circuit 40 corresponding to the pixel PB, the reference signal REFB is supplied to the gate of the transistor MN5.

In addition, the transistor MN6 has the gate to be supplied with the bias voltage Vb (bias voltage VbA or VbB) from the bias generator 34 (FIG. 13). Specifically, in the pixel circuit 40 corresponding to the pixel PA, the bias voltage VbA is supplied to the gate of the transistor MN6; and in the pixel circuit 40 corresponding to the pixel PB, the bias voltage VbB is supplied to the gate of the transistor MN6.

The transistors MP12 and MN14 of the control circuit 24 have the gates to be supplied with the control signal FV (control signal FVA or FVB) from the pixel driver 35 (FIG. 13). Specifically, in the pixel circuit 40 corresponding to the pixel PA, the control signal FVA is supplied to the gates of the transistors MP12 and MN14; and in the pixel circuit 40 corresponding to the pixel PB, the control signal FVB is supplied to the gates of the transistors MP12 and MN14.

As illustrated in FIG. 5, the pixel PA and the pixel PB are arranged alternately in the vertical direction in the pixel array 31. It is to be noted that this is not limitative, and as illustrated in FIG. 6, the pixel PA and the pixel PB may thus be arranged alternately in the horizontal direction in the pixel array 31.

The reference signal generator 32 is configured to generate the reference signals REFA and REFB on the basis of a command from the timing generator 37. As with the foregoing first embodiment, the reference signals REFA and REFB each have what is called the ramp waveform in which the voltage level gradually changes with a lapse of time during the P-phase period TP and the D-phase period TD. For example, the reference signal generator 32 is able to fix a voltage of one of the reference signals REFA and REFB to a predetermined voltage on the basis of a command from the timing generator 37. The reference signal generator 32 supplies the generated reference signal REFA to the pixel circuit 40 corresponding to the pixel PA in the pixel array 31, and supplies the generated reference signal REFB to the pixel circuit 40 corresponding to the pixel PB in the pixel array 31.

The bias generator 34 is configured to generate the bias voltages VbA and VbB. The bias generator 34 is able to set one of the bias voltages VbA and VbB to a ground level on the basis of a command from the timing generator 37. The bias generator 34 supplies the bias voltage Vb to the comparator circuit 22 of the pixel P. The bias generator 34 supplies the generated bias voltage VbA to the pixel circuit 40 corresponding to the pixel PA in the pixel array 31, and supplies the generated bias voltage VbB to the pixel circuit 40 corresponding to the pixel PB in the pixel array 31.

The pixel driver 35 generates the control signals OFG, TX, RSTA, RSTB, XSA, XSB, FVA, FVB, and XWR, supplies the control signals OFG, TX, and XWR to the light-receiving circuit 41 of the pixel circuit 40, supplies the control signals RSTA, XSA, and FVA to the pixel circuit 40 corresponding to the pixel PA, and supplies the control signals RSTB, XSB, and FVB to the pixel circuit 40 corresponding to the pixel PB, thereby controlling the operations of the pixel circuits 40. The pixel driver 35 supplies one control signal RSTA to all the pixels PA in the 33) pixel array 31, and supplies one control signal RSTB to all the pixels PB in the pixel array 31, for example. In addition, the pixel driver 35 supplies one control signal XSA to all the pixels PA in the pixel array 31, and supplies one control signal XSB to all the pixels PB in the pixel array 31, for example.

The timing generator 37 is configured to control an operation of the imaging device 2 by generating various timing signals and supplying the various generated timing signals to the reference signal generator 32, the time code generator 13, the bias generator 34, the pixel driver 35, and the signal processor 16.

Next, with attention focused on the pixel circuit 40 (pixel circuit 40A) to be supplied with the control signal VFA and the pixel circuit 40 (pixel circuit 40A) to be supplied with the control signal VFB, a description will be given of operations of these pixel circuits 40A and 40B in the operation modes MA and MB.

Figure 15:
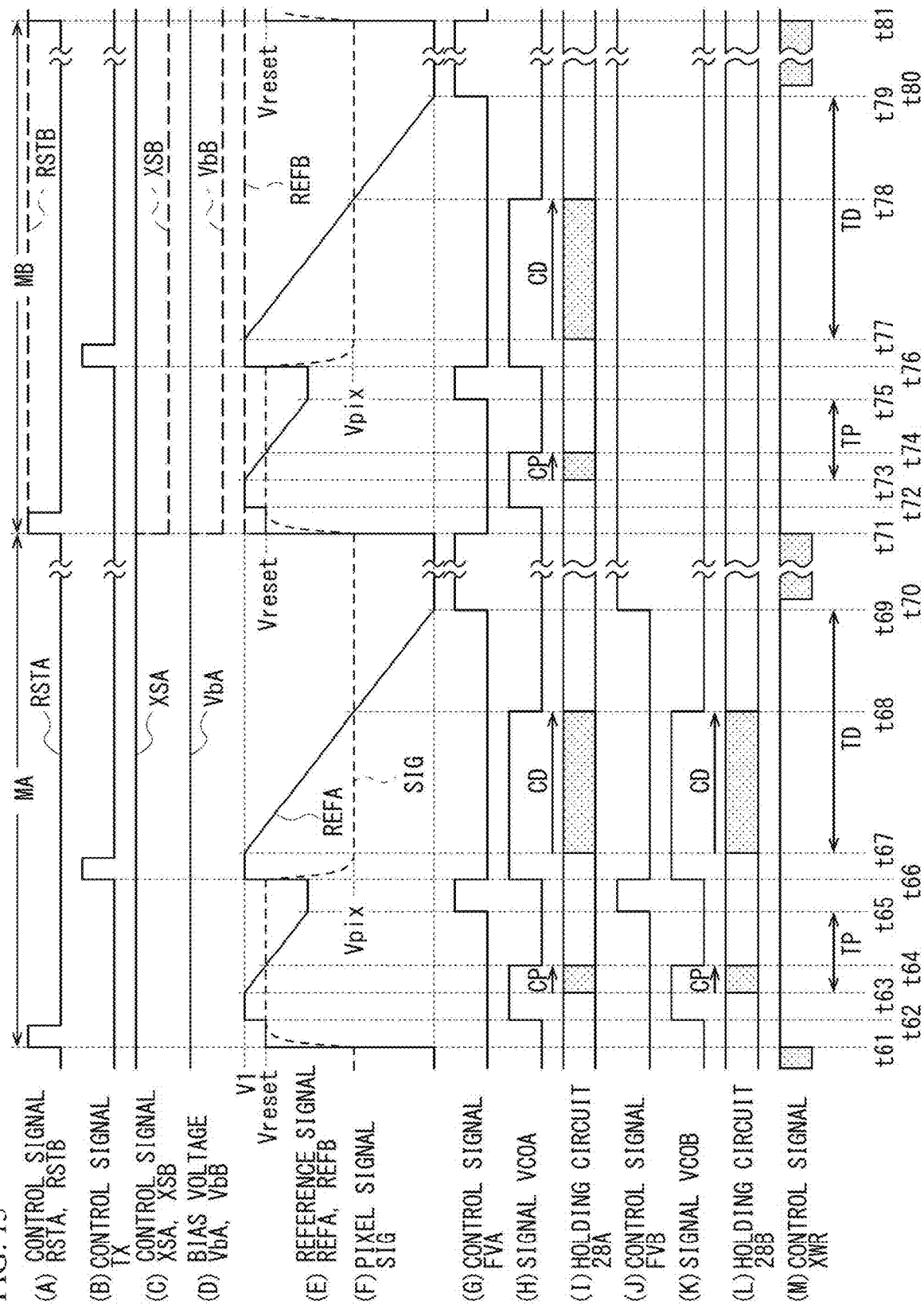
FIG. 15 is a timing waveform diagram illustrating an operation example of the pixel circuit illustrated in FIG. 14.

FIG. 15 illustrates an operation example of AD conversion in the pixel circuits 40A and 40B, in which (A) represents the waveforms of the control signals RSTA and RSTB, (B) represents the waveform of the control signal TX, (C) represents the waveforms of the control signals XSA and XSB, (D) represents the waveforms of the bias voltages VbA and VbB, (E) represents the waveforms of the reference signals REFA and REFB, (F) represents the waveform of the pixel signal SIG in the pixel circuits 40A and 40B, (G) represents the waveform of the control signal VFA to be supplied to the pixel circuit 40A, (H) represents the waveform of the signal VCO (signal VCOA) in the pixel circuit 40A, (I) represents the operation of the holding circuit 28 (holding circuit 28A) in the pixel circuit 40A, (J) represents the waveform of the control signal VFB to be supplied to the pixel circuit 40B, (K) represents the waveform of the signal VCO (signal VCOB) in the pixel circuit 40B, (L) represents the operation of the holding circuit 28 (holding circuit 28B) in the pixel circuit 40B, and (M) represents the waveform of the control signal XWR in the pixel circuits 40A and 40B.

Operations during a period from a timing t61 to a timing t71 represent the operations in the operation mode MA, and operations during a period from the timing t71 to a timing t81 represent the operations in the operation mode MB.

In the operation mode MA, the pixel driver 35 generates the control signals RSTA and RSTB ((A) of FIG. 15) similar to the control signal RST illustrated in FIG. 8 ((A) of FIG. 8), generates the control signals XSA and XSB ((C) of FIG. 15) that are at a high level, and generates the control signals VFA and VFB ((G) and (J) of FIG. 15) similar to the control signal FVA illustrated in FIG. 8 ((F) of FIG. 8). In addition, the reference signal generator 32 generates the reference signals REFA and REFB ((E) of FIG. 15) similar to the reference signal REF illustrated in FIG. 8 ((C) of FIG. 8). In addition, the bias generator 34 generates the bias voltages VbA and VbB ((D) of FIG. 15). Thus, each of the pixel circuits 40A and 40B performs AD conversion.

Specifically, for example, in the pixel circuit 40A, because the control signal XSA is kept at the high level, the transistors MN21, MP22, and MP23 of the comparator 43 are turned off. In addition, the gate of the transistor MN6 is supplied with the bias voltage VbA. In addition, the comparator 43 is supplied with the reference signal REFA having the ramp waveform, and the pixel signal SIG including the reset voltage Vreset and the pixel voltage Vpix ((E) and (F) of FIG. 15). Thus, the comparator 43 generates the signal CMP by comparing the pixel signal SIG with the reference signal REFA, similarly to the comparator 23 according to the foregoing first embodiment. Thus, the pixel circuit 40A performs AD conversion similarly to the pixel circuit 20 according to the foregoing first embodiment. This applies similarly to the pixel circuit 40B. Thus, in the imaging device 2, all the pixels P perform AD conversion.

In the operation mode MB, the pixel driver 35 generates the control signal RSTA similar to the control signal RST illustrated in FIG. 8 ((A) of FIG. 8), and generates the control signal RSTB that is to be kept at the high level ((A) of FIG. 15). In addition, the pixel driver 35 generates the control signal XSA that is at the high level and the control signal XSB that is at a low level ((C) of FIG. 15). In addition, the pixel driver 35 generates the control signal VFA similar to the control signal FVA illustrated in FIG. 8 ((F) of FIG. 8), and generates the control signal VFB that is to be kept at the high level ((G) and (J) of FIG. 15). In addition, the reference signal generator 32 generates the reference signal REFA similar to the reference signal REF illustrated in FIG. 8 ((C) of FIG. 8), and generates the reference signal REFB having the voltage V1 ((F) of FIG. 15). In addition, the bias generator 34 generates the bias voltage VbA and sets the bias voltage VbB to the ground level ((D) of FIG. 15). Thus, the pixel circuit 40A performs AD conversion, and the pixel circuit 40B does not performs AD conversion.

Specifically, in the pixel circuit 40A, because the control signal XSA is kept at the high level, the transistors MN21, MP22, and MP23 of the comparator 43 are turned off. In addition, the gate of the transistor MN6 is supplied with the bias voltage VbA. In addition, the comparator 43 is supplied with the reference signal REFA having the ramp waveform, and the pixel signal SIG including the reset voltage Vreset and the pixel voltage Vpix ((F) and (F) of FIG. 15). Thus, the comparator 43 generates the signal CMP by comparing the pixel signal SIG with the reference signal REF A, similarly to the comparator 23 according to the foregoing first embodiment. Thus, the pixel circuit 40A performs AD conversion similarly to the pixel circuit 20 according to the foregoing first embodiment.

In contrast, in the pixel circuit 40B, because the control signal XSB is kept at the low level, the transistors MN21, MP22, and MP23 of the comparator 43 are turned on, and the power supply voltage VDDH is supplied to the drains of the transistors MN4 and MN5. In addition, because the bias voltage VbB is set to the ground level, the transistor MN6 is turned off. In addition, the voltage V1 is supplied from the reference signal generator 32 to the gate of the transistor MN5 of the comparator 43 ((E) of FIG. 15). In addition, because the control signal RSTB is at the high level and the transistor MN3 is turned on, the power supply voltage VDDH is supplied to the gate of the transistor MN4 of the comparator 43. Thus, the comparator 43 does not perform the comparison operation, and the signal CMP is kept at the high level (power supply voltage VDDH). In addition, because the control signal FVB is kept at the high level ((J) of FIG. 15) as with the foregoing first embodiment, the control circuit 24 keeps the signal VCOB at the low level ((K) of FIG. 15), and the switch 27 keeps in the off-state. Thus, the AD conversion is not performed.

In this way, in the operation mode MB, the pixel circuit 40A performs AD conversion, whereas the pixel circuit 40B does not perform AD conversion. For the pixel P that does not perform AD conversion, the imaging device 2 is able to stop the operation of the comparator 43 and refrain from supplying the time code TC to the holding circuit 28 of the latch 26. This makes it possible for the imaging device 2 to reduce power consumption.

In the imaging device 2, the comparator 43 stops the comparison operation in the operation mode MB. Specifically, in this example, the bias generator 34 sets the bias voltage VbB to the ground level. This allows no current to flow through the comparator 43, thus allowing for reduction in power consumption.

As described above, in the present embodiment, the comparator stops the comparison operation in the operation mode MB. This makes it possible to reduce power consumption.

3. Usage Example of Imaging Device

Figure 16:
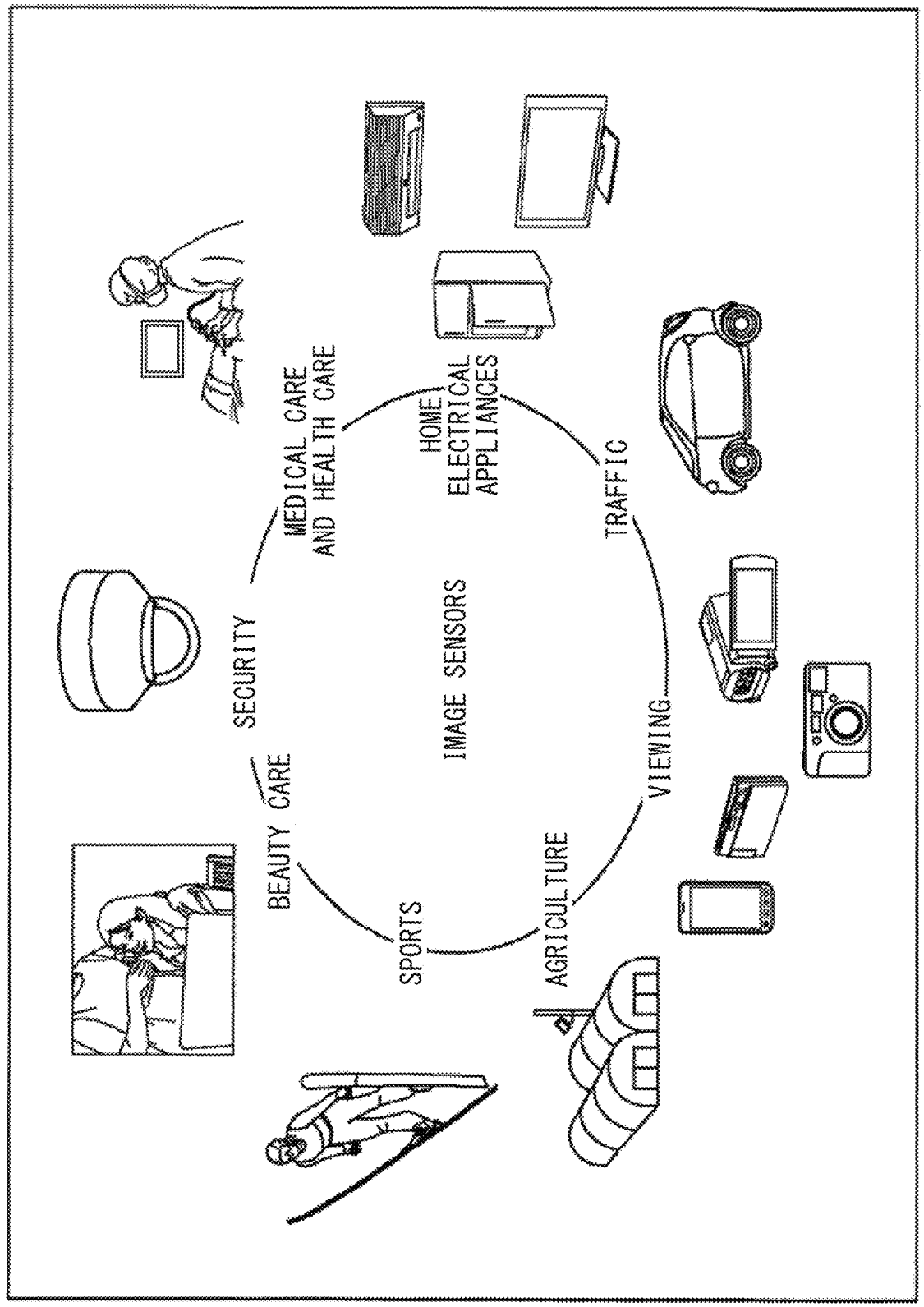
FIG. 16 is an explanatory diagram illustrating a usage example of the imaging device.

FIG. 16 illustrates a usage example of the imaging devices 1 and 2 according to the foregoing embodiments. For example, the imaging device 1 described above is usable in a variety of cases of sensing light such as visible light, infrared light, ultraviolet light, and X-ray as follows.

- Devices that shoot images for viewing such as digital cameras and mobile devices having a camera function
- Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure vehicle-to-vehicle distance
- Devices for use in home electrical appliances such as televisions, refrigerators, and air-conditioners to shoot images of a user's gesture and bring the appliances into operation in accordance with the gesture
- Devices for medical care and health care use such as endoscopes and devices that shoot images of blood vessels by receiving infrared light
- Devices for security use such as monitoring cameras for crime prevention and cameras for individual authentication
- Devices for beauty care use such as skin measuring devices that shoot images of skin and microscopes that shoot images of scalp
- Devices for sports use such as action cameras and wearable cameras for sports applications and the like
- Devices for agricultural use such as cameras for monitoring the states of fields and crops

4. Example of Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

Figure 17:
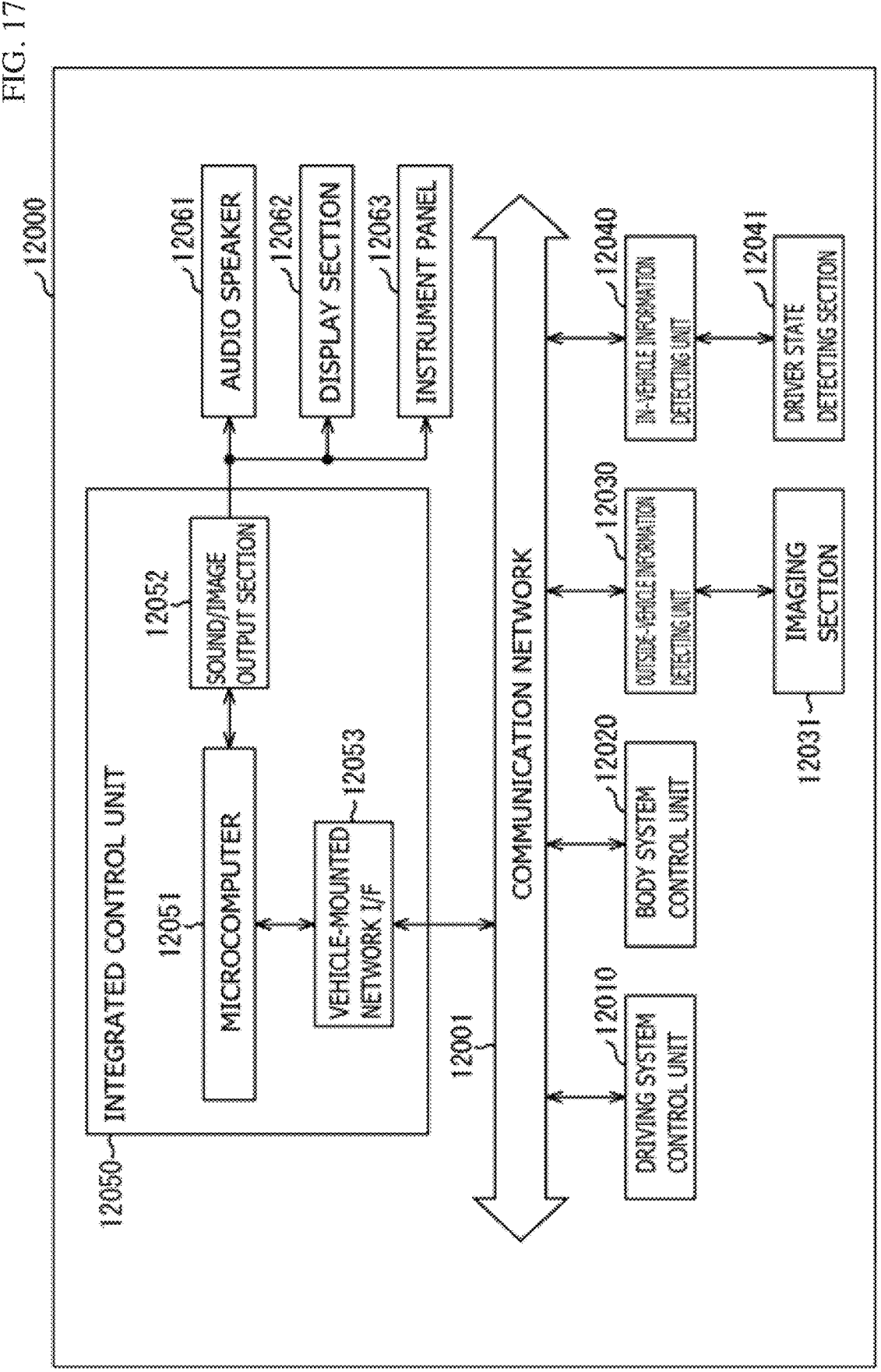
FIG. 17 is a block diagram depicting an example of schematic configuration of a vehicle control system.

FIG. 17 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 17, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 17, an audio speaker 12061, a display section 12062, and an instrument panel 12063 are illustrated as the output device. The display section 12062 may, for example, include at least one of an on-board display and a head-up display.

FIG. 18 is a diagram depicting an example of the installation position of the imaging section 12031.

In FIG. 18, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging sections 12101 and 12105 provided to the tipper portion of the windshield within the interior of the vehicle are used mainly to detect a preceding vehicle, a pedestrian, an obstacle, a signal, a traffic sign, a lane, or the like.

Incidentally, FIG. 18 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the vehicle control system to which the technology according to the present disclosure may be applied. The technology according to the present disclosure may be applied to the imaging section 12031 among the configurations described above. This makes it possible for the vehicle control system 12000 to selectively use the operation mode MA of obtaining a captured image of high resolution and the operation mode MB of obtaining a captured image of low resolution on a case-by-case basis. In addition, it is possible to reduce power consumption in the operation mode MB.

Although the present technology has been described above with reference to some embodiments, the modification examples, and specific application examples thereof, the present technology is not limited to these embodiments and the like, and may be modified in a variety of ways.

For example, in the embodiment described above, the pixels P are disposed over the two semiconductor substrates 101 and 102, but this is not limitative. The pixels may be disposed on one semiconductor substrate, or may be disposed over three or more semiconductor substrates.

It is to be noted that the effects described herein are merely illustrative and non-limiting, and other effects may be included.

It is to be noted that the present technology may have the following configurations. According to the present technology having the following configurations, it is possible to reduce power consumption.

(1)
An imaging device including:
a first pixel circuit including
a first light-receiving circuit configured to generate a first pixel signal corresponding to the amount of received light,
a first comparator configured to generate a first comparison signal by comparing the first pixel signal with a first reference signal having a ramp waveform,
a first control circuit configured to generate a first comparison output signal by turning on and off an output of the first comparison signal on the basis of a first control signal, and
a first latch circuit configured to latch a time code on the basis of transition of the first comparison output signal; and
a generation circuit configured to generate the first control signal.

(2)
The imaging device according to (1) described above, in which the first control circuit is configured to generate the first comparison output signal by, on the basis of the first control signal, selectively switching between a first operation of outputting the first comparison output signal corresponding to the first comparison signal and a second operation of outputting the first comparison output signal indicating a signal of a first logic level.

(3)
The imaging device according to (2) described above, in which
the first comparison output signal is configured to transition between the first logic level and a second logic level, and
the first latch circuit is configured to latch the time code on the basis of the transition of the first comparison output signal from the second logic level to the first logic level.

(4)
The imaging device according to (2) or (3) described above, in which
the first pixel circuit is configured to repeat an operation performed during an operation period including a comparison period during which the first comparator compares the first pixel signal with the first reference signal, and
the first control circuit is selectively switchable between the first operation and the second operation in units of the operation period.

(5)
The imaging device according to (4) described above, in which, during the operation period, in the case where the first control circuit performs the first operation, the first control signal transitions at an end timing of the comparison period.

(6)
The imaging device according to any one of (1) to (5) described above, in which
the first pixel circuit further includes a first selector that selects one of a plurality of control signals as the first control signal, and
the first control circuit is configured to generate the plurality of control signals.

(7)
The imaging device according to any one of (2) to (5) described above, in which the first comparator is configured to stop operation during a period during which the first control circuit performs the second operation.

(8)
The imaging device according to (1) described above, further including
a second pixel circuit including
a second light-receiving circuit configured to generate a second pixel signal corresponding to the amount of received light,
a second comparator configured to generate a second comparison signal by comparing the second pixel signal with the first reference signal,
a second control circuit configured to generate a second comparison output, signal by turning on and off the output of the first comparison signal on the basis of a second control signal, and
a second latch circuit configured to latch the time code on the basis of transition of the second comparison output signal, in which
the control circuit is configured to generate the second control signal in addition to the first control signal.

(9)
The imaging device according to (1) described above, further including
a second pixel circuit including
a second light-receiving circuit configured to generate a second pixel signal corresponding to the amount of received light,
a second comparator configured to generate a second comparison signal by comparing the second pixel signal with a second reference signal having a ramp waveform,
a second control circuit configured to generate a second comparison output signal by turning on and off the output of the first comparison signal on the basis of a second control signal, and a second latch circuit configured to latch the time code on the basis of transition of the second comparison output signal, in which the control circuit is configured to generate the second control signal in addition to the first control signal.

(10)
The imaging device according to (8) or (9) described above, in which the first control circuit is configured to, during a first period, output the first comparison signal as the first comparison output signal on the basis of the first control signal, and the second control circuit is configured to, during the first period, output a signal of a first logic level as the second comparison output signal on the basis of the second control signal.

(11)
An analog-to-digital conversion circuit including:
a conversion circuit including
    a comparator configured to generate a comparison signal by comparing an analog signal with a reference signal having a ramp waveform,
    a control circuit configured to generate a comparison output signal by turning on and off an output of the comparison signal on the basis of a control signal, and
    a latch circuit configured to latch a time code on the basis of transition of the comparison output signal; and
a generation circuit configured to generate the control signal.

This application claims the benefit of Japanese Priority Patent Application JP2021-066051 filed with the Japan Patent Office on Apr. 8, 2021, the entire contents of which are incorporated herein by reference.

It should be understood by those skilled in the art that various modifications, combinations, sub-combinations, and alterations may occur depending on design requirements and other factors insofar as they are within the scope of the appended claims, or the equivalents thereof.

The invention claimed is:

1. An imaging device comprising:
a first pixel circuit including
a first light-receiving circuit configured to generate a first pixel signal corresponding to an amount of received light,
a first comparator configured to generate a first comparison signal by comparing the first pixel signal with a first reference signal having a ramp waveform,
a first control circuit configured to generate a first comparison output signal by turning on and off an output of the first comparison signal on a basis of a first control signal, and
a first latch circuit configured to latch a time code on a basis of transition of the first comparison output signal; and
a generation circuit configured to generate the first control signal,
wherein the first control circuit is configured to generate the first comparison output signal by, on the basis of the first control signal, selectively switching between a first operation of outputting the first comparison output signal corresponding to the first comparison signal and a second operation of outputting the first comparison output signal indicating a signal of a first logic level.

2. The imaging device according to claim 1, wherein
the first comparison output signal is configured to transition between the first logic level and a second logic level, and
the first latch circuit is configured to latch the time code on the basis of the transition of the first comparison output signal from the second logic level to the first logic level.

3. The imaging device according to claim 1, wherein
the first pixel circuit is configured to repeat an operation performed during an operation period including a comparison period during which the first comparator compares the first pixel signal with the first reference signal, and
the first control circuit is selectively switchable between the first operation and the second operation in units of the operation period.

4. The imaging device according to claim 3, wherein, during the operation period, in a case where the first control circuit performs the first operation, the first control signal transitions at an end timing of the comparison period.

5. The imaging device according to claim 1, wherein
the first pixel circuit further includes a first selector that selects one of a plurality of control signals as the first control signal, and
the generation circuit is configured to generate the plurality of control signals.

6. The imaging device according to claim 1, wherein the first comparator is configured to stop operation during a period during which the first control circuit performs the second operation.

7. The imaging device according to claim 1, further comprising:
a second pixel circuit including
a second light-receiving circuit configured to generate a second pixel signal corresponding to an amount of received light,
a second comparator configured to generate a second comparison signal by comparing the second pixel signal with the first reference signal,
a second control circuit configured to generate a second comparison output signal by turning on and off the output of the first comparison signal on a basis of a second control signal, and
a second latch circuit configured to latch the time code on a basis of transition of the second comparison output signal, wherein
the generation circuit is configured to generate the second control signal in addition to the first control signal.

8. The imaging device according to claim 1, further comprising:
a second pixel circuit including
a second light-receiving circuit configured to generate a second pixel signal corresponding to an amount of received light,
a second comparator configured to generate a second comparison signal by comparing the second pixel signal with a second reference signal having a ramp waveform,
a second control circuit configured to generate a second comparison output signal by turning on and off the output of the first comparison signal on a basis of a second control signal, and
a second latch circuit configured to latch the time code on a basis of transition of the second comparison output signal, wherein the generation circuit is configured to generate the second control signal in addition to the first control signal.

9. An imaging device comprising:
a first pixel circuit including
a first light-receiving circuit configured to generate a first pixel signal corresponding to an amount of received light,
a first comparator configured to generate a first comparison signal by comparing the first pixel signal with a first reference signal having a ramp waveform,
a first control circuit configured to generate a first comparison output signal by turning on and off an output of the first comparison signal on a basis of a first control signal, and
a first latch circuit configured to latch a time code on a basis of transition of the first comparison output signal;
a second pixel circuit including
a second light-receiving circuit configured to generate a second pixel signal corresponding to an amount of received light,
a second comparator configured to generate a second comparison signal by comparing the second pixel signal with the first reference signal,
a second control circuit configured to generate a second comparison output signal by turning on and off the output of the first comparison signal on a basis of a second control signal, and
a second latch circuit configured to latch the time code on a basis of transition of the second comparison output signal; and
a generation circuit configured to generate the first control signal and the second control signal, wherein
the first control circuit is configured to, during a first period, output the first comparison signal as the first comparison output signal on the basis of the first control signal, and
the second control circuit is configured to, during the first period, output a signal of a first logic level as the second comparison output signal on the basis of the second control signal.

10. An analog-to-digital conversion circuit comprising:
a conversion circuit including
a comparator configured to generate a comparison signal by comparing an analog signal with a reference signal having a ramp waveform,
a control circuit configured to generate a comparison output signal by turning on and off an output of the comparison signal on a basis of a control signal, and
a latch circuit configured to latch a time code on a basis of transition of the comparison output signal; and
a generation circuit configured to generate the control signal,
wherein the control circuit is configured to generate the comparison output signal by, on the basis of the control signal, selectively switching between a first operation of outputting the comparison output signal corresponding to the comparison signal and a second operation of outputting the comparison output signal indicating a signal of a first logic level.

11. The analog-to-digital conversion circuit according to claim 10, wherein
the comparison output signal is configured to transition between the first logic level and a second logic level, and
the latch circuit is configured to latch the time code on the basis of the transition of the comparison output signal from the second logic level to the first logic level.

12. The analog-to-digital conversion circuit according to claim 10, wherein
the conversion circuit is configured to repeat an operation performed during an operation period including a comparison period during which the comparator compares the analog signal with the reference signal, and
the control circuit is selectively switchable between the first operation and the second operation in units of the operation period.

13. The analog-to-digital conversion circuit according to claim 12, wherein, during the operation period, in a case where the control circuit performs the first operation, the control signal transitions at an end timing of the comparison period.

* * * * *